US012232023B2

(12) United States Patent
Gundavelli et al.

(10) Patent No.: US 12,232,023 B2
(45) Date of Patent: *Feb. 18, 2025

(54) PROVIDING SLICE ATTRIBUTE INFORMATION TO USER EQUIPMENT IN A MOBILE NETWORK ENVIRONMENT

(71) Applicant: Cisco Technology, Inc., San Jose, CA (US)

(72) Inventors: Srinath Gundavelli, San Jose, CA (US); Vimal Srivastava, Bangalore (IN); Oliver James Bull, Bristol (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/508,427

(22) Filed: Nov. 14, 2023

(65) Prior Publication Data
US 2024/0089844 A1  Mar. 14, 2024

Related U.S. Application Data

(63) Continuation of application No. 17/494,107, filed on Oct. 5, 2021, now Pat. No. 11,910,299.

(51) Int. Cl.
*H04W 48/16* (2009.01)
*H04W 12/06* (2021.01)
(Continued)

(52) U.S. Cl.
CPC .......... *H04W 48/16* (2013.01); *H04W 12/06* (2013.01); *H04W 60/00* (2013.01); *H04W 76/10* (2018.02)

(58) Field of Classification Search
CPC ..... H04W 48/16; H04W 48/18; H04W 76/10; H04W 76/12; H04W 12/06; H04W 60/00; H04W 8/08
See application file for complete search history.

(56) References Cited

U.S. PATENT DOCUMENTS 11,051,192 B2   6/2021  Li et al.
2019/0021047 A1* 1/2019  Zong ................... H04W 40/24
(Continued)

FOREIGN PATENT DOCUMENTS

WO   2020192871 A1   10/2020
WO   2021063981 A1   4/2021

OTHER PUBLICATIONS

3GPP: "3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1, Technical Specification, Apr. 2021, 758 Pages.

(Continued)

*Primary Examiner* — Khawar Iqbal
(74) *Attorney, Agent, or Firm* — Edell, Shapiro & Finnan, LLC

(57) ABSTRACT

Presented herein are techniques to facilitate providing slice attribute information to a user equipment (UE) for one or more slice types with which the user equipment is allowed to establish one or more session(s). In one example, a method may include obtaining, by a network element, a registration request for connection of a UE to a mobile network; performing an authentication for connection of the UE to the mobile network; and upon successful authentication, providing, by the network element, a registration response to the UE, wherein the registration response identifies one or more network slice types with which the UE is authorized to establish a session and the registration response identifies one of: attribute information for each of the one or more network slice types or network location information from which attribute information for each of the one or more network slice types is to be obtained.

20 Claims, 10 Drawing Sheets

(51) Int. Cl.
*H04W 60/00* (2009.01)
*H04W 76/10* (2018.01)

(56) References Cited

U.S. PATENT DOCUMENTS

| | | | |
|---|---|---|---|
| 2020/0169951 A1* | 5/2020 | Cai | H04W 4/24 |
| 2020/0329008 A1 | 10/2020 | Dao | |
| 2021/0120484 A1* | 4/2021 | Thorat | H04W 28/0268 |
| 2022/0103987 A1* | 3/2022 | Shan | H04W 60/00 |
| 2022/0104164 A1 | 3/2022 | Kedalagudde et al. | |
| 2022/0264540 A1* | 8/2022 | Panchal | H04W 72/04 |
| 2022/0264669 A1 | 8/2022 | Qiao et al. | |
| 2022/0337993 A1 | 10/2022 | Landais et al. | |
| 2022/0353151 A1 | 11/2022 | Yu et al. | |
| 2022/0369155 A1* | 11/2022 | Hedman | H04W 28/18 |
| 2022/0386228 A1* | 12/2022 | Dao | H04W 36/0009 |
| 2023/0022005 A1* | 1/2023 | Qiao | H04W 64/00 |
| 2023/0040614 A1* | 2/2023 | Bakker | H04W 60/00 |
| 2023/0048066 A1* | 2/2023 | Lei | H04W 12/72 |
| 2023/0052699 A1* | 2/2023 | Ninglekhu | H04W 60/04 |
| 2023/0070882 A1* | 3/2023 | Youn | H04W 28/02 |
| 2023/0087052 A1* | 3/2023 | Korja | H04L 63/0263 709/245 |
| 2023/0094062 A1 | 3/2023 | Kim et al. | |
| 2023/0096469 A1* | 3/2023 | Kaippallimalil | H04W 36/12 370/392 |
| 2023/0199632 A1* | 6/2023 | Talebi Fard | H04W 48/16 455/434 |
| 2023/0269589 A1* | 8/2023 | Baskaran | H04W 12/037 726/6 |
| 2024/0080923 A1* | 3/2024 | Qiao | H04W 40/246 |

OTHER PUBLICATIONS

3GPP: "3rd Generation Partnership Project; Technical Specification Group Core Network and Terminals; User Equipment (UE) policies for 5G System (5GS); Stage 3 (Release 17)," 3GPP TS 24.526 V17.3.0, Jun. 2021, 54 pages.

3GPP, "3rd Generation Partnership Project; Technical Specification Group Services and System Aspects; Policy and Charging Control Framework for the 5G System (5GS); Stage 2 (Release 17)," 3GPP TS 23.503 V17.1.0, Jun. 2021, 137 Pages.

3GPP: "3rd Generation Partnership Project; Technical Specification Group Services and System Aspects; Procedures for the 5G System (5GS); Stage 2 (Release 17)," 3GPP TS 23.502 V17.1.0, Jun. 2021, 692 Pages.

3GPP: "3rd Generation Partnership Project; Technical Specification Group Services and System Aspects; System Architecture for the 5G System (5GS); Stage 2 (Release 17)," 3GPP TS 23.501 V17.1.1, Technical Specification, Jun. 2021, 526 Pages.

Cheshire S., et al., "DNS-Based Service Discovery," Internet Engineering Task Force (IETF), Request for Comments: 5763, Category: Standards Track, Feb. 2013, 49 Pages.

Cloudflare: "What is a DNS TXT Record?," Retrieved from URL: https://www.cloudflare.com/learning/dns/dns-records/dns-txt-record/, retrieved Oct. 1, 2021, 4 pages.

Crocker D., "DNS AttrLeaf Changes: Fixing Specifications That Use Underscored Node Names," Internet Engineering Task Force (IETF), Request for Comments: 8553, BCP: 222, Category: Best Current Practice, SSN: 2070-1721, Mar. 2019, 15 pages.

GSMA: "Generic Network Slice Template," Official Document NG.116, Version 2.0, Oct. 16, 2019, 61 pages.

Gulbrandsen A., et al., "A DNS RR for Specifying the Location of Services (DNS SRV)," Network Working Group, Request for Comments: 2782, Obsoletes: 2052, Category: Standards Track, Feb. 2000, 12 Pages.

Mockapetris P., "Domain Names—Implementation and Specification", Network Working Group, Request for Comments: 1035, Nov. 1987, 55 pages.

Rosenbaum R., "Using the Domain Name System to Store Arbitrary String Attributes", Network Working Group, Request for Comments: 1464, May 1993, 4 Pages.

* cited by examiner

PROVIDING SLICE ATTRIBUTE INFORMATION TO USER EQUIPMENT IN A MOBILE NETWORK ENVIRONMENT

PRIORITY CLAIM

This application is a continuation of and claims the benefit of priority to U.S. patent application Ser. No. 17/494,107, filed Oct. 5, 2021, and issued on Feb. 20, 2024, as U.S. Pat. No. 11,910,299, the entirety of which application is incorporated herein by reference.

TECHNICAL FIELD

The present disclosure relates to network equipment and services.

BACKGROUND

Networking architectures have grown increasingly complex in communications environments, particularly mobile networking environments. In particular, network slicing is a networking concept that has been introduced for Third Generation Partnership Project (3GPP) mobile networks, such as 3GPP Fifth Generation (5G) mobile networks. With the introducing of network slicing architectures, there are significant challenges in managing network communications and connectivity for mobile network devices.

DESCRIPTION OF EXAMPLE EMBODIMENTS

Overview

Figure 1:
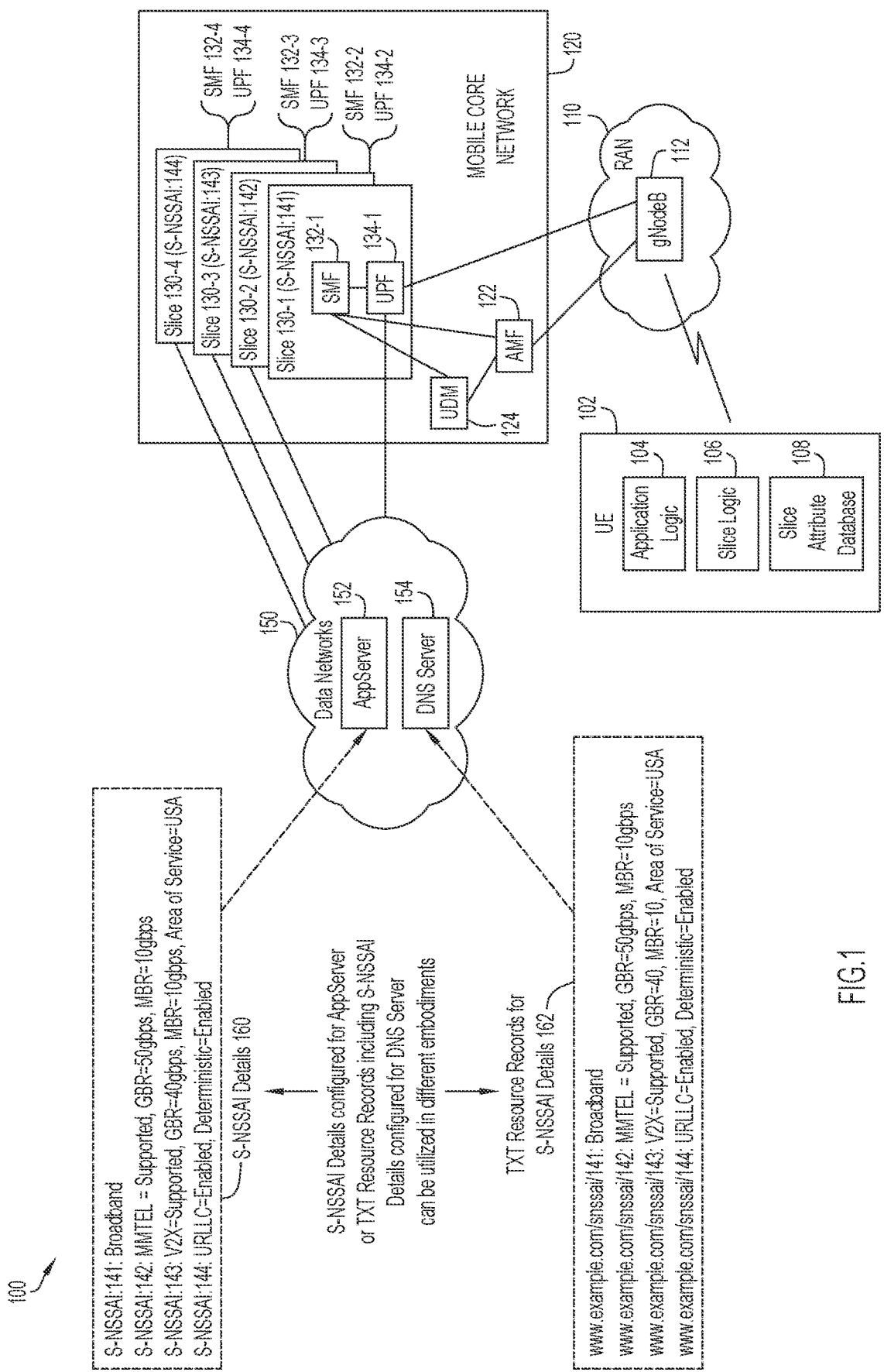
FIG. 1 is a block diagram of a system in which techniques may be implemented to facilitate providing slice attribute information to a user equipment in a mobile network environment, according to an example embodiment.

Presented herein are techniques to facilitate providing slice attribute information to a user equipment (UE). In one embodiment, a method is provided that may include obtaining, by a network element of a mobile core network, a registration request for connection of a user equipment to the mobile core network; performing an authentication for connection of the user equipment to the mobile core network; and upon successful authentication of the user equipment for connection to the mobile core network, providing, by the network element, a registration response to the user equipment, wherein the registration response identifies one or more network slice types with which the user equipment is authorized to establish a session and the registration response identifies one of: attribute information for each of the one or more network slice types or network location information from which attribute information for each of the one or more network slice types is to be obtained.

Example Embodiments

Presented herein are various techniques that may facilitate providing slice attribute information to a user equipment (UE) in a mobile network environment. Network slicing is a key concept in the Third Generation Partnership Project (3GPP) Fifth Generation (5G) System architecture. A network slice is a logical end-to-end network that can be dynamically created. Generally, a network slice also referred to generally as a 'slice' or can refer to a group or set of Virtualized Network Functions (VNFs) that are configured to facilitate a certain mobile network service or group of mobile network services.

A given UE may have access to multiple slices over the same Radio Access Network (RAN). Each slice may serve a particular service type with an agreed upon Service-level Agreement (SLA). To provide mobile network services associated with a given slice type, a slice of the given slice type can be instantiated in which the instantiated slice for the slice type can provide certain mobile network services to a number of UEs.

A network slice instance within a Public Land Mobile Network PLMN can include any combination of Next Generation (NG) RAN and/or core network control plane and user plane network functions.

Per-3GPP Technical Specification (TS) 23.501, Section 5.15.2, Single-Network Slice Selection Assistance Information (S-NSSAI) can be used to uniquely identify a slice in which an S-NSSAI includes a Slice/Service Type (SST), which indicates the expected slice behavior for a slice requested by a UE in terms of expected features and services, and a Slice Differentiator (SD), which is optional and can be used to differentiate among multiple slices of a same SST.

Different types of slices (slice types) can be configured for a mobile network such that each slice type can provide certain mobile network services. As referred to herein and in the claims, the terms 'slice' and 'slice instance' may be used interchangeably to refer to a slice type that is instantiated (e.g., configured, created, operated, etc.) within a mobile core network to provide one or more mobile network services for one or more user equipment. Various VNFs that can be configured for a slice type in accordance with techniques described herein can include Third Generation Partnership Project (3GPP) Fourth Generation/Long Term Evolution (4G/LTE) VNFs and/or Fifth Generation (5G) VNFs, as may be prescribed, at least in part, by 3GPP standards.

Various example slice types can include, but not be limited to, a cellular vehicle to everything (V2X) slice type that can provide cellular V2X services, an Internet of Things (IoT or IOT) massive IoT (mIoT) slice type that can provide IoT related services, an Ultra-Reliable Low-Latency Communication (URLLC) slice type that can provide URLLC services, an enhanced Mobile Broadband (eMBB) slice type that can provide mobile broadband services, a massive Machine-Type Communication (mMTC) slice type that can provide MTC services, a High Performance Machine-Type Communication (HMTC) slice type that can provide HMTC services, etc. Other slice types can be envisioned.

For various examples herein, a slice type requested by a UE can be referenced generally as a number or value, however, it is to be understood that a slice requested by the UE can correspond to an SST value and, optionally, an SD, in accordance with 3GPP specifications. It is to be understood that additional SST values may be configured by a mobile network operator for other slice types. Additionally, slice type values used for various examples/embodiments described herein may differ from the standardized SST values provided by 3GPP specifications. However, it is to be understood that the slice type values discussed for examples/embodiments herein are provided for illustrative purposes only in order to illustrate various features of the techniques described herein and are not meant to limit the broad scope of the present disclosure.

With the goal to characterize network slices and to bring a consistent meaning across mobile operators, the Global System for Mobile Communications (GSM) Association (GSMA) has defined the Generic Slice Template (GST), NG.116, in which a GST represents a set of common slice attributes for a given slice type. By filling the GST with values for all or a subset of the attributes for a given slice type, concrete slices can be described. A GST filled with values is called the Network Slice Type (NEST). Thus a slice can be characterized on its capability and the services that it offers.

In the current 3GPP system architecture, a UE can initially be configured with S-NSSAI values (e.g., SST and optionally SD values). After the UE's registration to a mobile core network, the network can provide the UE with a list of allowed S-NSSAI values for the slice type(s) that the UE is subscribed/allowed to establish one or more Protocol Data Unit (PDU) session(s).

The UE can use a corresponding S-NSSAI value to establish PDU session(s) with a given slice type in order to receive services from a slice instance that slice type. The UE can either be preconfigured or dynamically configured by the network with the mapping of applications/services and the corresponding S-NSSAI value that is to be utilized for the applications/services such that the UE can create PDU session(s) on the corresponding slice instance for a corresponding slice type. As referred to herein, an S-NSSAI value can also be referred to as an S-NSSAI.

In other words, a binding can be provided between an application identifier (App-ID) and a slice and that binding, from the UE point of view, is fixed such that the does not have an understanding of the true capabilities of a slice with respect to application behavior. Every network slice has a set of properties that can be used to characterize the service that it provides. However, the UE currently has no awareness of such properties. Rather, the awareness that the UE currently has is based on an identifier of a slice and traffic selectors for a corresponding the App-ID/slice mapping that identifies the slice that the UE is to utilize use for a given application, as that relationship/mapping can either be statically provisioned on the UE, or dynamically delivered to the UE from the network in the form of a UE Route Selection Policy (URSP) policy.

This approach works fine as long as the network has the list of all the applications that a given UE may be using and when the network can characterize an application to a given slice. However, this may be impractical in some instances as the network may not be aware of all the applications that multiple UEs in the network may use, or the application performance criteria of each of those applications.

In the absence of an explicit App-Id to S-NSSAI mapping indication being obtained by a UE from the network, the UE will bind an application to a default slice, represented by a default slice ID. However, the default slice may or may not be able to meet the application's performance criteria. Further, the UE may not be able to provide application performance criteria to the network for the network to be able to provide an indication to the UE of a suitable slice that meets those criteria.

Accordingly, there is value in enabling a UE with the awareness of the network slice characteristics for each of the slices that it is authorized to use (e.g., establish at least one PDU session with), so that the UE and/or application logic provided for the UE can select a slice that best suits performance/operating criteria for a given application that is operated for the UE. This may be especially relevant for enterprise branch office/telework customer premise equipment (CPE) deployments that leverage 5G services from a mobile network operator (MNO) in which the decision point on what application is to receive which slice is typically a local decision and intelligence resides in the CPE and in enterprise policy functionality, with no role for the MNO on the application awareness, other than charging the enterprise for the slice usage. In current deployments, the UE does not have an understanding of service(s) offered by different slice(s), but, as noted above, merely maps applications (App-IDs) to particular slices/DNNs based on App-ID to slice/DNN policies.

In order to address the issues discussed above, three techniques are described herein that can be utilized within a mobile core network for delivering slice properties, broadly referred to herein as 'slice attribute information' to a user equipment to provide awareness to the UE regarding various slice properties. A first technique includes delivering a corresponding slice attribute uniform resource identifier (URI) to a UE via a Non-Access Stratum (NAS) communication for each corresponding slice type with which a UE is allowed/authorized to establish one or more session(s). The UE can utilize a given slice attribute URI for a given slice to obtain attribute information for the slice from a network location, such as an application server (AppServer). A second technique includes delivering slice attribute information to a UE via a NAS communication for one or more slice type(s) with which a given UE is allowed/authorized to establish one or more session(s). In one instance, the slice attribute information can be delivered to the UE via one or more corresponding Attribute-Value Pairs (AVPs). Further, a third technique includes delivering slice attribute information to a UE via a Domain Name System (DNS) exchange for one or more slice type(s) with which a given UE is allowed/authorized to establish one or more session(s) in which the slice attribute information is delivered to the UE via one or more DNS text (TXT) records. Thus, described herein are various techniques for providing slice attributes to a UE.

Referring to FIG. 1, FIG. 1 is a block diagram of a system 100 in which techniques may be implemented to facilitate providing slice attribute information to a user equipment in a mobile network environment, according to an example embodiment.

As shown in FIG. 1, system 100 may include a UE 102, a Radio Access Network (RAN) 110, a mobile core network 120, and one or more data networks 150. UE 102 may be configured with application logic 104, slice logic 106, and a slice attribute database 108. RAN 110 may be implemented as a 3GPP 5G/next generation (nG) RAN and may include one or more gNodeB 112 (sometimes referred to as a 'gNB').

In at least one embodiment, mobile core network 120 may be representative of a 5G core (5GC) network and may include an Access and Mobility Management Function (AMF) 122, and a Unified Data Management (UDM) entity 124. In some instances, UDM 124 may interface with or include a Unified Data Repository (UDR), not shown in FIG. 2. Mobile core network 120 may also include a number of slice instances, that have been instantiated for corresponding slice types provided by mobile core network 120 for various services (e.g., mIoT, URLLC, etc.) that may be provided mobile core network 120 for one or more PDU sessions for UE 102.

For example, mobile core network 120 may include a slice 130-1, a slice 130-2, a slice 130-3, and a slice 130-4 in which each slice may be configured to provide services for each of a corresponding slice type and may be identified by a corresponding S-NSSAI. Each slice may include a corresponding Session Management Function (SMF) and a corresponding User Plane Function (UPF).

For example, slice 130-1 may include an SMF 132-1 and a UPF 134-1 and may be identified by an S-NSSAI of '141'. In one instance, slice 130-1 may represent an instantiated slice instance for a default slice type that can be provided by mobile core network 120. Slice 130-2 may represent an instantiated slice instance for another slice type that may include an SMF 132-2 and a UPF 134-2 and may be identified by an S-NSSAI of '142'. Slice 130-3 may represent an instantiated slice instance for another slice type that may include an SMF 132-3 and a UPF 134-3 and may be identified by an S-NSSAI of '143'. Slice 130-4 may represent an instantiated slice instance for yet another slice type that may include an SMF 132-4 and a UPF 134-4 and may be identified by an S-NSSAI of '144'. The SMFs and UPFs for each of slice 130-2, 130-3, and 130-4 are labeled but not shown in FIG. 1 for purposes of brevity only in order to illustrate/discuss other features of system 100.

The VNFs (e.g., SMF 132-1 and UPF 134-1) for the slices of mobile core network 120 are shown for illustrative purposes only and are not meant to limit the broad scope of the present disclosure. It is to be understood that any VNFs may be provided for network slices as may be prescribed by 3GPP standards, GSMA standards, etc. various mobile network services that may be provided by various slice types.

Further, it is to be understood that other VNFs/network elements may be configured for mobile core network 120 for any combination of Third Generation (3G)/Fourth Generation (4G)/5G/nG implementations, such as any combination of a Policy Control Function (PCF), a Policy and Charging Rules Function (PCRF), a Network Slice Selection Function (NSSF), a Network Repository Function (NRF), a Home Subscriber Server (HSS), a Mobility Management Entity (MME), a Serving Gateway (SGW), a Packet Data Network (PDN) Gateway (PGW), any Control and User Plane Separation (CUPS) components, and/or the like in accordance with any 3GPP specifications.

In various embodiments, the data networks 150 of FIG. 1 may include be any combination of the Internet, a gaming network, an Internet Protocol (IP) Multimedia Subsystem (IMS), an Ethernet data network (not shown), Ethernet switching system(s) (not shown), and/or the like. Data networks 150 may include an application server (App-Server) 152 and a DNS server 154 to facilitate various operations discussed for embodiments herein.

RAN 110, via gNodeB 112, may interface with mobile core network 120 via one or more wired and/or wireless interfaces. For example, gNodeB 112 may interface with AMF 122. The gNodeB 112 may also interface with each of UPF 134-1 of slice 130-1, UPF 134-2 of slice 130-2, UPF 134-3 of slice 130-3, and UPF 134-4 of slice 130-4. RAN 110, via gNodeB 112, may also interface with UE 102 via one or more over-the-air Radio Frequency (RF) connections.

Regarding mobile core network 120, AMF 122 may further interface with UDM 124. AMF 122 may also interface with each of SMF 132-1 of slice 130-1, SMF 132-2 of slice 130-2, SMF 132-3 of slice 130-3, and SMF 132-4 of slice 130-4. UDM 124 may also interface with each of SMF 132-1 of slice 130-1, SMF 132-2 of slice 130-2, SMF 132-3 of slice 130-3, and SMF 132-4 of slice 130-4. SMF 132-1 and UPF 134-1 of slice 130-1 may further interface with each other. SMF 132-2 and UPF 134-2 of slice 130-2 may further interface with each other. SMF 132-3 and UPF 134-3 of slice 130-3 may further interface with each other. SMF 132-4 and UPF 134-4 of slice 130-4 may further interface with each other. Additionally, UPF 134-1 of slice 130-1 may further interface with data networks 150 (e.g., with any combination of AppServer 152 and/or DNS server 154), UPF 134-2 of slice 130-2 may also interface with data networks 150, UPF 134-3 of slice 130-3 may also interface with data networks 150, and UPF 134-4 of slice 130-4 may also interface with data networks 150.

The various interfaces shown in FIG. 1 are provided for illustrative purposes only and are not meant to limit the broad scope of the present disclosure. It is to be understood that network connectivity/interfaces among any of UE 102, RAN 110, mobile core network 120 and data networks 150, and any elements/logic associated therewith, may be provided in any manner/configuration in accordance with 3GPP standards to facilitate operations as discussed for embodiments herein.

Generally, RAN 110 may include any combination of one or more 3GPP 5G/nG gNodeB or gNB, such as gNodeB 112 and/or 3GPP 4G/LTE evolved node Bs (eNodeBs or eNBs), not shown, to facilitate network connectivity between UE 102 and mobile core network 120. A gNodeB/eNodeB, such as gNodeB 112, may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for RAN 110 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, a RAN, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 102, may utilize to connect to RAN 110 for one or more sessions (e.g., voice, video, data, gaming, combinations thereof, etc.) with a mobile core network, such as mobile core network 120.

A UE, such as UE 102, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100.

In addition to various operations discussed for techniques herein, an AMF, such as of AMF 122, may facilitate access and mobility management control/services for one or more UE, such as UE 102, for connection of the UE 102 with mobile core network 120. In addition to various operations discussed for techniques herein, an SMF, such as SMF 132-1 for slice 130-1, for example, may be responsible for UE PDU session management (SM), with individual functions/services being supported on a per-session basis in order to facilitate data transfer(s) between a UE and one or more data networks 150 via one or more UPFs. Generally, a UPF, such as UPF 134-1 of slice 130-1, for example, may operate to provide packet routing and forwarding operations for user data traffic and may also perform a variety of functions such as packet inspection, traffic optimization, Quality of Service (QoS), policy enforcement and user data traffic handling (e.g., to/from one or more data networks 150), and billing operations (e.g., accounting, etc.) for UE 102 sessions. Typically, the UDM 124 stores subscription data for subscribers (e.g., UE 102) that can be retrieved and/or otherwise obtained/utilized during operation of system 100.

As noted, embodiments herein may provide for the ability to provide slice attribute information to UE 102 for slices 130-1, 130-2, 130-3, and 130-4 as supported/provided by mobile core network 120 utilizing various techniques, which may be realized using AppServer 152 or DNS server 154. As illustrated in FIG. 1, UE 102 includes application logic 104, which may represent one or more applications operating on UE 102, such as audio/video streaming applications, enterprise applications, social networking applications, combinations thereof, and/or the like.

In various embodiments, slice attribute information for a given network slice can include any service parameters, performance parameters, combinations thereof, and/or the like (e.g., as may be codified by 3GPP specifications, GSMA specifications, etc.) that can characterize one or more services facilitated/supported by a given network slice type (e.g., a given S-NSSAI) including, but not limited to, one or more of/any combination of an identification of one or more services provided/supported by the slice type (e.g., mIoT support, Multimedia Telephony (MMTel) support, Narrow Band IoT (NB-IoT) support, URLLC support, etc.), a guaranteed bit rate (GBR) supported by the slice type, a maximum bit rate (MBR) supported by the slice type, QoS information/attributes (e.g., one or more QoS Class Identifiers (QCI(s)) or 5G QoS Identifier(s) (5QI(s))), service area (Area of Service) information, downlink (DL) throughput per network slice, DL throughput per UE, uplink (UL) throughput per network slice, UL throughput per UE, an indication of group communication support, energy efficiency information, isolation level information (e.g., physical isolation or logical isolation), maximum supported packet size, mission critical support information, number of connections (e.g., sessions) supported, number of terminals supported, reliability information, Session and Service Continuity (SSC) support information, delay tolerance information, an indication of deterministic communication support, any other slice attributes as may be defined by GSMA via GST NG.116, any other attributes as may be defined by any other standards organizations, network operators, service providers, enterprise entities, combinations thereof, and/or the like. Different SSC types or modes can include SSC Type 1, which indicates that, during registration, a UE IP address is not to be changed; SSC Type 2, which indicates that a UE IP address can be changed and that a new IP connection for the UE is to be created after removing a previous/existing IP connection for the UE; and SSC Type 3, which indicates that a UE IP address can be changed and that a new IP connection for the UE is to be created before removing a previous/existing IP connection for the UE.

In addition to operations discussed for embodiments herein, an application server, such as AppServer 152 may facilitate operations for the one or more applications operating on UE 102. For example, in one embodiment, AppServer 152 can be provisioned or otherwise configured to include S-NSSAI details 160 in which the S-NSSAI details 160 can include slice attribute information for network slice types provided by the mobile core network 120. The slice attribute information may include overall properties, characteristics, service information, etc., as discussed herein, that characterizes each of the slice types provided by mobile core network 120 in contrast to slice attribute information that is subscriber-specific. Stated differently, the slice attribute information provided to a UE in accordance with embodiments herein is not subscriber specific, but rather indicates overall attribute information for each of the slice types that can be accessed by any subscribers that are authorized to access a given slice type. As shown in FIG. 1, S-NSSAI details 160 can be configured to identify slice attribute information including: slice 130-1 identified via S-NSSAI '141' as being configured as a broadband slice ('S-NSSAI:141: Broadband'; slice 130-2 identified via S-NSSAI '142' as supporting Multimedia Telephony (MMTeL) at a GBR of 50 gigabits per second (gbps) and an MBR of 10 gbps ('S-NSSAI:142: MMTEL=Supported, GBR=50 gbps, MBR=10 gbps'); slice 130-3 identified via S-NSSAI '143' as being configured to support V2X services at a GBR of 40 gbps and an MBR of 10 gbps having an area of service as the United States ('S-NSSAI:143: V2X=Supported, GBR=40 gbps, MBR=10, Area of Service=USA')'; and slice 130-4 identified via S-NSSAI '144' as supporting URLLC services having deterministic service guarantees ('S-NSSAI: 144: URLLC=Enabled, Deterministic=Enabled). Determinism refers to whether the delay between transmission of a message and receipt of the message at a destination address is stable (e.g., within certain bounds). Usually, a communication is referred to as deterministic if it is bounded by a given threshold for the latency/transmission time. Thus, the 'Deterministic' attribute defines if a network slice supports deterministic communication for periodic user traffic in which periodic traffic refers to the type of traffic with periodic transmissions. In some instances, slice attribute information for a given slice can also be generally referred to herein interchangeably as a 'property file'.

In addition to operations discussed for embodiments herein, a DNS server, such a DNS server 154, may provide lookup services for system resources (e.g., hosts, services, functions, etc.) to provide resource records for various DNS queries. In one instance, resource records may include A and AAAA resource records in an which A record may define an IP version 4 (IPv4) host address and an AAAA resource record may define an IP version 6 (IPv6) host address.

Resource records may also include text (TXT) resource records (also referred to as TXT records), as prescribed at least by Internet Engineering Task Force (IETF) Request For Comments (RFC) 6763. For example, TXT resource records for S-NSSAI details 162 can be provisioned or otherwise configured to include slice attribute information on a per-URI basis for each of slices 130-1, 130-2, 130-3, and 130-4.

In accordance with various embodiments herein, slice attribute information can be provided to UE 102 using S-NSSAI details 160 as configured for AppServer 152 or using S-NSSAI TXT records for S-NSSAI details 162 configured for DNS server 154. In various embodiments, slice attribute information can be provisioned for AppServer 152 and/or for DNS TXT records by any combination of a network operator, service provider, enterprise entity (e.g., for a private network), and/or slice provider.

For example, in accordance with one technique to provide slice attribute information to UE 102 (as discussed in further detail herein with reference to FIGS. 2 and 3A-3B, below), in at least one embodiment when UE 102 registers to the mobile core network 120, a network element of the 5GC/mobile core network 120, such AMF 122 can provide UE 102, via a NAS Registration Accept message (e.g., a registration response), with a list of URI(s) for the S-NSSAI(s) value(s) of the slice type(s) of mobile core network 120 with which the UE 102 is allowed/authorized to establish one or more PDU session(s). Upon obtaining the URI(s), the UE 102, via slice logic 106, can obtain slice attribute information for the corresponding slice(s) by using the URI to query AppServer 152 for the slice attribute information contained in the S-NSSAI details 160 for the corresponding slice(s). The slice attribute information for the corresponding slice(s) obtained by UE 102 based on the query can be stored in slice attribute database 108 in association with each S-NSSAI for each corresponding slice.

Figure 2:
FIG. 2 is a diagram illustrating example details associated with slice attribute information that can be communicated to a user equipment, according to an example embodiment.

FIG. 2 illustrates an example query/response 200 exchange that may be provided in accordance with embodiments herein. For example, the UE 102 may perform (via slice logic 106) a query upon AppServer 152 using a URI query 202 'https://appserver.com/s-nssai/242' for a slice identified by S-NSSAI '242' and AppServer 152 may provide a slice attribute information response 204 for the slice based on S-NSSAI details configured for the AppServer. In various embodiments, slice attribute information provided in a response by AppServer 152 may be encoded using an Extensible Markup Language (XML) encoding, a JavaScript Object Notation (JSON) encoding, a Type-Length-Value (TLV) encoding, and/or the like. An XML encoding is illustrated for the slice attribute information response 204 shown in FIG. 2.

For the example, shown in FIG. 2, the S-NSSAI '242' slice attribute information response 204 includes slice attribute information for the slice that identifies that the slice is an IMS slice that supports SSC modes 1, 2, and 3 for MMTEL, that the slice supports QCIs 1, 2, and 5, and that the slice supports uplink (UL) UE throughput at a 100 megabits per second (mbps) GBR and a 100 mbps MBR. It is to be understood that any throughput rates may be identified (e.g., 1 gbps, etc.) and/or any other slice attributes may be identified.

Returning to FIG. 1, in accordance with another technique to provide slice attribute information to UE 102 (as discussed in further detail herein with reference to FIG. 4, below), when UE 102 registers to the mobile core network 120, a network element of the 5GC/mobile core network 120, such as AMF 122 may, in at least one embodiment, fetch/obtain (e.g., using a similar query) slice attribute information from AppServer 152/S-NSSAI details 160 for the slice type(s) with which UE 102 is allowed/authorized to establish one or more PDU session(s) and may provide the slice attribute information to UE 102 in a NAS Registration Accept message (generally, a registration response message) using an AVP that includes each of an S-NSSAI and slice attribute information for the corresponding S-NSSAI in which the slice attribute information can be stored in slice attribute database 108. In another embodiment for this technique, UDM 124 can be configured to store slice attribute information (e.g., S-NSSAI details 160) and can provide the slice attribute information to AMF 122 during registration or authentication of UE 102 for connecting to the mobile core network 120. In yet another embodiment for this technique, a NSSF (not shown) within mobile core network 120 can store slice attribute information and can provide the information to AMF 122 for communicating to UE 102.

In accordance with yet another technique to provide slice attribute information to UE 102 (as discussed in further detail herein with reference to FIG. 5, below), when UE 102 registers to the mobile core network 120, a network element of the 5GC/mobile core network 120 provides UE 102 with an address or URI for DNS server 154 and Fully Qualified Domain Name(s) (FQDN(s)) for slice(s) to which the UE 102 is authorized/allowed to connect and the UE 102, via slice logic 106, can query the DNS server 154 for slice attribute information as contained in the TXT resource records for S-NSSAI details 162 configured for DNS server 154. The slice attribute information for the corresponding slice(s) obtained by UE 102 based on the query can be stored in slice attribute database 108 in association with each S-NSSAI for each corresponding slice.

Upon obtaining and storing slice attribute information for the one or more slice type(s) with which the UE 102 is allowed/authorized to establish one or more PDU session(s), the UE 102, via slice logic 106 and application logic 104, can select a corresponding slice type with which to establish a PDU session for a particular application using the S-NSSAIs and slice attribute information stored in slice attribute database 108. In some instances, the selection may further be based on one or more user inputs provided for UE 102.

Consider one example in which application logic 104 for UE 102 is configured for an IMS application that involves MMTel support (e.g., to facilitate voice over Long Term Evolution (VoLTE) calling, Wi-Fi calling, etc.). Thus, in this example, UE 102, via slice logic 106/application logic 104 can search through stored slice attribute information for the slice types with which the UE is allowed/authorized to establish PDU session(s) to determine a slice that supports MMTel (e.g., MMTel=True, MMTel=Supported, etc.), such as slice 130-2 S-NSSAI 142. Consider another example in which application logic 104 for UE 102 is configured for an application involving SSC Type 1 (also referred to as SSC Mode 1) connectivity. In this example, UE 102, via slice logic 106/application logic 104 can search through stored slice attribute information for the slice types with which the UE is allowed/authorized to establish PDU session(s) in order to determine a slice that supports SSC Type=1 or SSC Mode=1.

In still another example, consider that application logic 104 for UE 102 is configured for an IMS application in which a given call is to utilize a particular audio coder/decoder (codec) that involves a particular bandwidth (e.g., range, type, etc.). In this example, UE 102, via slice logic 106/application logic 104 can search through stored slice attribute information for the slice types with which the UE is allowed/authorized to establish PDU session(s) in order to determine a slice that supports the bandwidth (e.g., satisfying one or more attributes, such as UL throughput per network slice, UL throughput per UE, DL throughput per network slice, DL throughput per UE, etc.).

It is to be understood that these examples of network slice selection that can be performed by a UE are provided for illustrative purposes only and are not meant to limit the broad scope of the present disclosure. Virtually any slice attribute information and/or combination of slice attribute information (e.g., a combination including MMTel=True, Isolation=Physical, and SSCType=1) may be utilized to perform slice selection by a UE and, thus, are clearly within the scope of embodiments herein.

Consider various operational details for each of the techniques that may be utilized for providing slice attribute information to a UE as discussed above, with further reference to FIGS. 3A-3B, 4, and 5, discussed below.

Figure 3A:
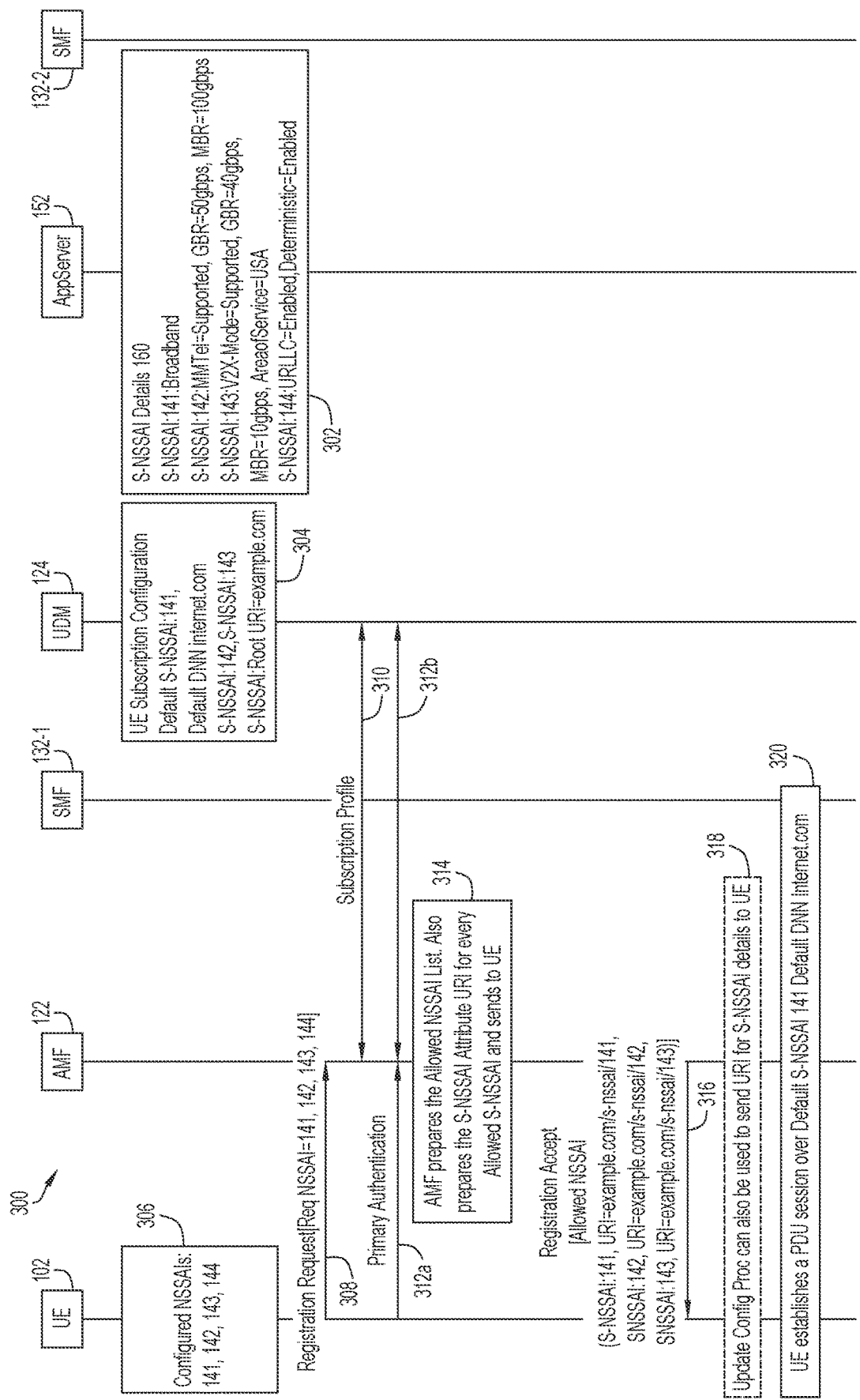
FIGS. 3A and 3B are a message sequence diagram illustrating a call flow associated with providing slice attribute information to a user equipment utilizing an application server, according to an example embodiment.
Figure 3B:
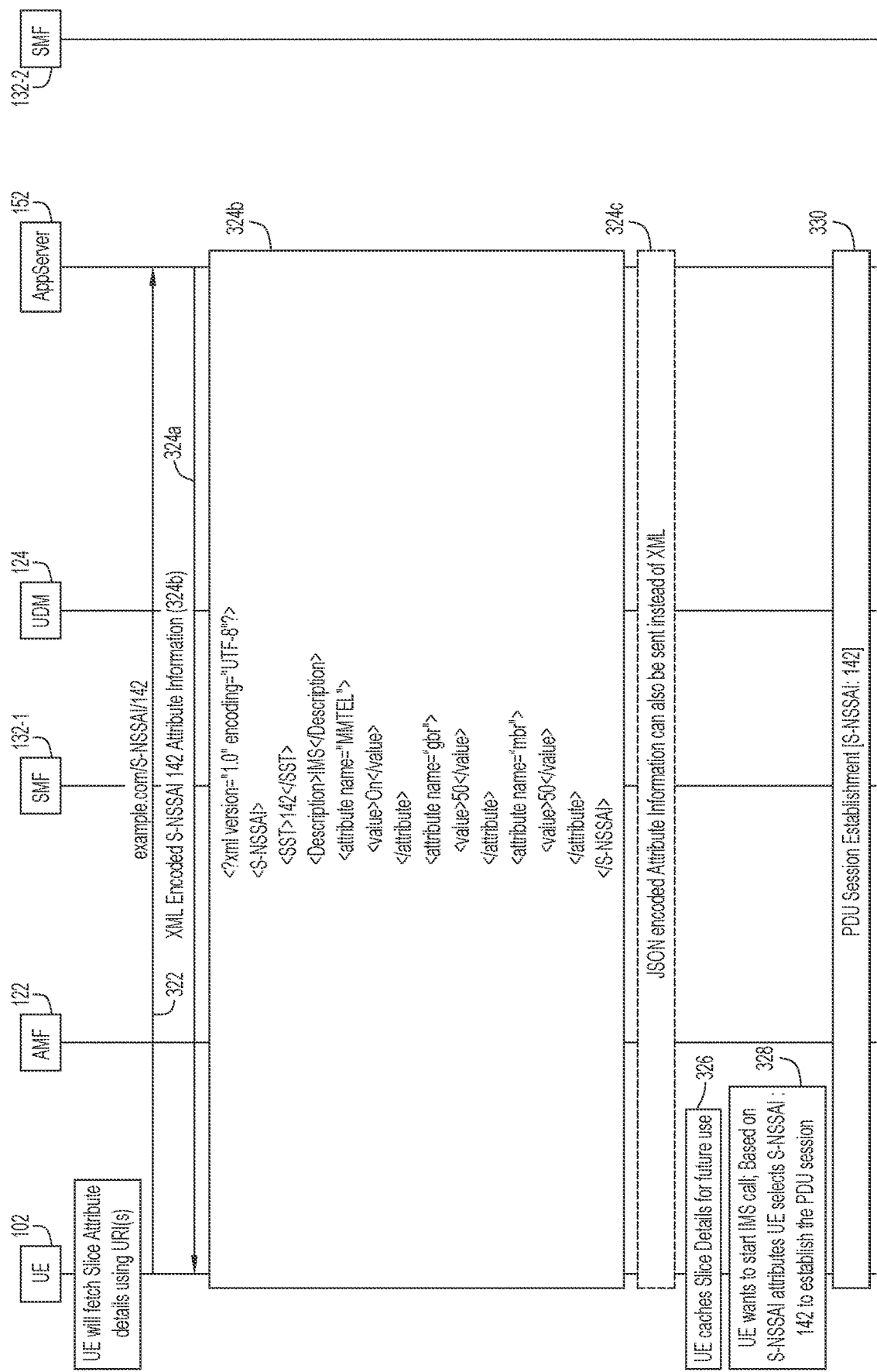

For example, FIGS. 3A and 3B are a message sequence diagram illustrating a call flow 300 associated with providing slice attribute information to a user equipment (e.g., UE 102) utilizing AppServer 152, according to an example embodiment. FIGS. 3A and 3B includes UE 102, AMF 122, SMF 132-1 for slice 130-1, UDM 124, AppServer 152, and SMF 132-2 for slice 130-2. Although not shown in FIGS. 3A and 3B, it is assumed that UE 102 interacts/communicates with various network elements via RAN 110/gNodeB 112, as shown in FIG. 1.

For the embodiment of FIGS. 3A and 3B, consider, as shown at 302, that AppServer 152 is configured with S-NSSAI details 160 that include slice attribute information for each of slices 130-1, 130-2, 130-3, and 130-4 for the corresponding slice types provided by mobile core network 120, as discussed above with reference to FIG. 1. At 304, consider that UDM 124 is configured with a subscription profile for a user or subscriber associated with UE 102 that identifies the default slice type with which UE 102 is authorized to establish at least one PDU session is slice 130-1, configured as 'Default S-NSSAI: 141' for a default Data Network Name (DNN) 'internet.com'. The subscription profile configured for UDM 124 at 304 further identifies that UE 102 is authorized to establish one or more PDU session(s) with slice 130-2 ('S-NSSAI: 142') and to slice 130-3 ('S-NSSAI: 143'). The subscription profile configured for UDM 124 at 304 further identifies an NSSAI root URI of 'example.com' ('NSSAI root URI=example.com') that AMF 122 can utilize to generate a URI for each slice type with which UE 102 is authorized to establish one or more PDU session(s) (e.g., slice 130-1, 130-2, and 130-3 in this example) that enables the UE 102 to obtain slice attribute information for each slice from AppServer 152.

Further, at 306, consider that UE 102 is configured with a set of NSSAIs, such as NSSAIs '141', '142', '143', and '143' that identify slice types that UE 102 may utilize for various services; however, as discussed below, the subscriber for UE 102 may not be authorized to utilize services (e.g., establish session(s) with) for all the slice types configured at 306, depending on the subscription profile for the subscriber associated with UE 102.

For example, as shown at 308, consider that UE 102 sends a NAS Registration Request to AMF 122 identifying NSSAIs '141', '142', '143', and '143' for the slice types with which UE 102 may desire network connectivity/services. At 310, AMF 122 obtains the subscription profile for UE 102 from UDM 124 and, at 312a and 312b, primary authentication for UE 102 is performed among AMF 122, UDM 124, and UE 102 as prescribed at least by 3GPP TS 23.502. Upon successful authentication of UE 102 for connection to the mobile core network 120, AMF 122 prepares, at 314, an allowed S-NSSAI list that identifies the slice type(s) with which UE 102 is authorized to establish one or more PDU session(s) and also prepares an S-NSSAI attribute URI for every S-NSSAI in the list such that the S-NSSAI and the corresponding S-NSSAI attribute URI for each slice to which the UE 102 is allowed to connect can be sent to the UE.

Generally, authentication (e.g., primary authentication involving UE 102) refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity (e.g., establish a PDU session with one or more slice type(s)), typically inherited from authentication when logging on to an application or service (e.g., registration request for connection of UE 102 to the mobile core network 120 through which the subscription profile for UE 102 is obtained). In various instances, authorization may be determined based on a range of restrictions, for example time-of-day restrictions, or physical location restrictions, restrictions against multiple accesses by the same entity or user/device, combinations thereof, and/or the like.

In one instance, each S-NSSAI and S-NSSAI attribute URI can be formatted as an AVP of a format [S-NSSAI, S-NSSAI attribute URI]. Each S-NSSAI attribute URI can be generated by AMF 122 utilizing the NSSAI root URI, 'example.com', contained in the subscription profile for UE 102. The syntax/format for generating each of a given S-NSSAI attribute URI can be configured for AMF 122. For example, in one embodiment, S-NSSAI attribute URIs can be configured to have a format of: '<NSSAI root URI>/s-nssai/<S-NSSAI>' such that each [S-NSSAI, S-NSSAI attribute URI] AVP for each slice type with which UE 102 is authorized to establish one or more PDU session(s) for the embodiment of FIGS. 3A and 3B can be generated as:

S-NSSAI:141, URI=example.com/s-nssai/141
S-NSSAI:142, URI=example.com/s-nssai/142
S-NSSAI:143, URI=example.com/s-nssai/143

At 316, AMF 122 communicates a NAS Registration Accept message (generally, a registration response message) including the AVPs that identify allowed S-NSSAI list and the S-NSSAI attribute URI for each slice 130-1, 130-2, and 130-3 for the corresponding slice types with which UE 102 is authorized to establish one or more PDU session(s).

In some embodiments, as shown at 318, AMF 122 can utilize an enhanced update configuration (config) process in order to send S-NSSAI attribute URIs to UE 102. For example, as prescribed by 3GPP TS 24.501, Section 5.4.4.2, a CONFIGURATION UPDATE COMMAND message can be sent to a UE that may include allowed S-NSSAI information. In at least one embodiment, 3GPP the update config process may be enhanced such that the CONFIGURATION UPDATE COMMAND message can include the S-NSSAI attribute URI generated for each slice type with which UE 102 is authorized to establish one or more PDU session(s).

Returning to the present example, consider at 320 that UE 102 establishes a PDU session over slice 130-1 (S-NSSAI: '141') via SMF 132-1 and UPF 134-1 (not shown in FIGS. 3A and 3B) for the default DNN 'internet.com'. The PDU session may be established according to procedures as prescribed by 3GPP standards, for example, as prescribed at least by 3GPP TS 23.501, 23.502, and 23.503.

Thereafter, the UE 102 can fetch/obtain slice attribute information for one or more of the authorized slice types/S-NSSAIs utilizing the S-NSSAI attribute URIs obtained from AMF 122. For example, as shown at 322 for FIG. 3B, UE 102 performs a query on AppServer 152 utilizing the default PDU session [recall, each UPF for each of slices 130-1, 130-2, 130-3, and 130-4, such as UPF 134-1 for slice 130-1 is connected to data networks 150] in order to obtain slice attribute information for S-NSSAI '142' (slice 130-2) utilizing the S-NSSAI attribute URI 'example.com/s-nssai/142' communicated to AppServer 152 (e.g., utilizing a Hypertext Transfer Protocol (HTTP) query involving the S-NSSAI attribute URI for S-NSSAI '141'). Based on the query, AppServer 152 returns XML encoded S-NSSAI '142' attribute information (for slice 130-2) to UE 102 at 324*a*. The example XML encoded S-NSSAI '142' attribute information as stored in the S-NSSAI details 160 for the slice is shown at 324*b*. In some instances, the attribute information for slice 130-2 can also be sent to the UE in a JSON encoded format, as shown at 324*c*. Other encoding formats can also be envisioned.

As shown at 326, the UE 102 can store the attribute information for slice 130-2/S-NSSAI '142' via slice attribute database 108. In one embodiment, the storing at 326 can include the UE 102 storing mapping information that associates each network slice type to the attribute information for each network slice type (e.g., S-NSSAI ↔attribute information, for each authorized S-NSSAI).

At 328, consider that UE 102 desires to initiate an IMS call and, based on the slice attributes stored for slice 130-2/S-NSSAI '142' selects, via application logic 104 and slice logic 106, slice 130-2/S-NSSAI '142' with which to establish a PDU session for the IMS call. For example, the UE 102, via application logic 104/slice logic 106 can search through slice attribute information cached at 326 to identify a slice type that supports MMTel (e.g., MMTel=Supported) in order to select 130-2 S-NSSAI '142'. As shown at 330, UE 102 establishes over slice 130-2 (S-NSSAI: '142') via SMF 132-2 and UPF 134-2 (not shown in FIGS. 3A and 3B) for the IMS call using 3GPP standards-based procedures.

Accordingly, FIGS. 3A and 3B illustrate one technique through with slice attribute information can be provided to a UE, such as UE 102, based on allowed S-NSSAI information and S-NSSAI attribute URIs provided to the UE 102 via one or more network elements of mobile core network, such a AMF 122, which may perform various operations based on the subscription profile for UE 102 stored via UDM 124.

Figure 4:
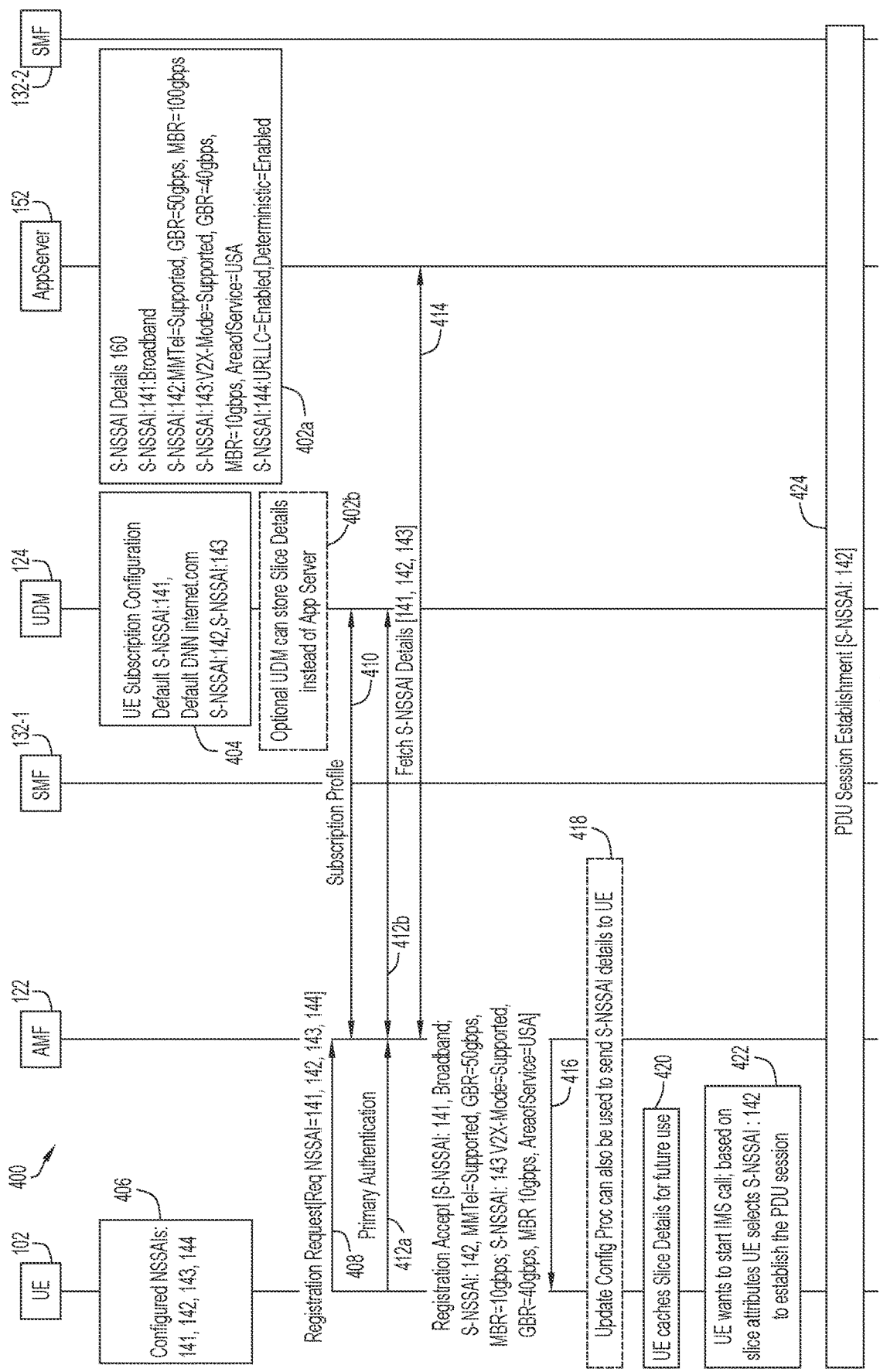
FIG. 4 is a message sequence diagram illustrating another call flow associated with providing slice attribute information to a user equipment utilizing an application server, according to an example embodiment.

Referring to FIG. 4, FIG. 4 is a message sequence diagram illustrating another call flow 400 associated with providing slice attribute information to a user equipment utilizing AppServer 152, according to an example embodiment. FIG. 4 includes UE 102, AMF 122, SMF 132-1 for slice 130-1, UDM 124, AppServer 152, and SMF 132-2 for slice 130-2. Although not shown in FIG. 4, it is assumed that UE 102 interacts/communicates with various network elements via RAN 110/gNodeB 112, as shown in FIG. 1.

For the embodiment of FIG. 4, consider, as shown at 402*a*, that AppServer 152 is configured with S-NSSAI details 160 that include slice attribute information for each of slices 130-1, 130-2, 130-3, and 130-4 for the corresponding slice types provided by mobile core network 120, as discussed above with reference to FIG. 1. In some embodiments, as shown at 402*b*, the S-NSSAI details 160 containing slice attribute information for each of slices 130-1, 130-2, 130-3, and 130-4 may optionally be configured for UDM 124, as shown at 402*b*.

Returning to the present example, consider at 404 that UDM 124 is configured with a subscription profile for a user or subscriber associated with UE 102 that identifies the default slice type with which UE 102 is authorized to establish at least one PDU session is slice 130-1, configured as 'Default S-NSSAI: 141' for a default Data Network Name (DNN) 'internet.com'. The subscription profile configured for UDM 124 at 404 further identifies that UE 102 is authorized to establish one or more PDU session(s) with slice 130-2 ('S-NSSAI: 142') and to slice 130-3 ('S-NSSAI: 143').

Unlike the subscription profile as discussed above for FIG. 3A at 304, the subscription profile configured for UDM 124 at 404 for the embodiment of FIG. 4 does not include an NSSAI root URI configuration. Rather, as discussed below, AMF 122 in at least one embodiment of FIG. 4 may fetch/obtain the slice attribute information for the one or more slice type(s) with which UE 102 is authorized to establish PDU session(s) from AppServer 152 and may thereafter send the slice attribute information to UE 102. In another embodiment, AMF 122 may fetch/obtain the slice attribute information from UDM 124 (e.g., if the UDM 124 is configured with such information, as discussed above for 402*b*).

Further, at 406, consider that UE 102 is configured with a set of NSSAIs, such as NSSAIs '141', '142', '143', and '143' that identify slice types that UE 102 may utilize for various services; however, as discussed below, the subscriber for UE 102 may not be authorized to utilize services (e.g., establish session(s) with) for all the slice types configured at 406, depending on the subscription profile for the subscriber associated with UE 102.

For example, as shown at 408, consider that UE 102 sends a NAS Registration Request to AMF 122 identifying NSSAIs '141', '142', '143', and '143' for the slices to which UE 102 may desire network connectivity. At 410, AMF 122 obtains the subscription profile for UE 102 from UDM 124 and, at 412*a* and 412*b*, primary authentication for UE 102 is performed among AMF 122, UDM 124, and UE 102. Upon successful authentication of UE 102 for connection to the mobile core network 120, AMF 122 can fetch/obtain slice attribute information from the S-NSSAI details 160 configured for AppServer 152 for the allowed S-NSSAI(s)/slice type(s) with which UE 102 is authorized to establish one or more sessions, such as for S-NSSAIs '141', '142' and '143', as shown at 414. Typically, the default slice (e.g., slice-1 S-NSSAI '141') is a general purpose slice and AMF 122 may or may not obtain slice information for the default slice.

In one embodiment, AMF 122 can be configured with a root URI for AppServer 152 (e.g., 'example.com') and can fetch/obtain the slice attribute information for each of S-NSSAI '141', '142' and '143' by generating and utilizing a corresponding S-NSSAI attribute URIs for each S-NSSAI (e.g., as discussed above for the embodiment of FIGS. 3A and 3B) in order to query/obtain the slice attribute information from AppServer 152. In one embodiment, AMF 122 may utilize HTTP queries involving the S-NSSAI attribute URIs for each S-NSSAI.

As noted above, in another embodiment for this technique, UDM 124 can be configured to store slice attribute information (e.g., S-NSSAI details 160) and can provide the slice attribute information to AMF 122 during registration or authentication of UE 102 for connecting to the mobile core network 120. In yet another embodiment for this technique, a NSSF (not shown) within mobile core network 120 can store slice attribute information and can provide the information to AMF 122 for communicating to UE 102.

Returning to the present example, as shown at 416, AMF 122 communicates a NAS Registration Accept message including the AVPs that identify each allowed S-NSSAI and corresponding slice attribute information for each allowed S-NSSAI corresponding each of slices 130-1, 130-2, and 130-3 for the slice types with which UE 102 is authorized to establish one or more PDU session(s) (e.g., formatted as "S-NSSAI: 'sst', Attributes" for each slice type).

In some embodiments, as shown at 418, AMF 122 can utilize an enhanced update configuration (config) process in order to send each allowed S-NSSAI and corresponding slice attribute information for each allowed S-NSSAI to UE 102. For example, in at least one embodiment, 3GPP the update config process may be enhanced such that the CONFIGURATION UPDATE COMMAND message can include each allowed S-NSSAI and corresponding slice attribute information for each slice type with which UE 102 is authorized to establish one or more PDU session(s).

Returning to the present example, as shown at 420, the UE 102 can cache/store the attribute information for slice 130-2/S-NSSAI '142' and for slice 130-3/S-NSSAI '143' via slice attribute database 108. In one embodiment, the storing at 420 can include the UE 102 storing mapping information that associates each network slice type to the attribute information for each network slice type (e.g., S-NSSAI ↔ attribute information, for each authorized S-NSSAI).

At 422, consider that UE 102 desires to initiate an IMS call and, based on the slice attributes stored for slice 130-2/S-NSSAI '142' selects, via application logic 104 and slice logic 106, slice 130-2/S-NSSAI '142' with which to establish a PDU session for the IMS call (.e.g, matching MMTel=supported, etc. as discussed herein). As shown at 424, UE 102 establishes over slice 130-2 (S-NSSAI: '142') via SMF 132-2 and UPF 134-2 (not shown in FIG. 4) for the IMS call using 3GPP standards-based procedures.

Accordingly, FIG. 4 illustrates another technique through with slice attribute information can be provided to a UE, such as UE 102, via one or more network elements of mobile core network, such a AMF 122, which may perform various operations based on the subscription profile for UE 102 stored via UDM 124, including fetching/obtaining slice attribute information from AppServer 152 for the S-NSSAI(s)/slice type(s) with which UE 102 is authorized to establish one or more PDU session(s).

Figure 5:
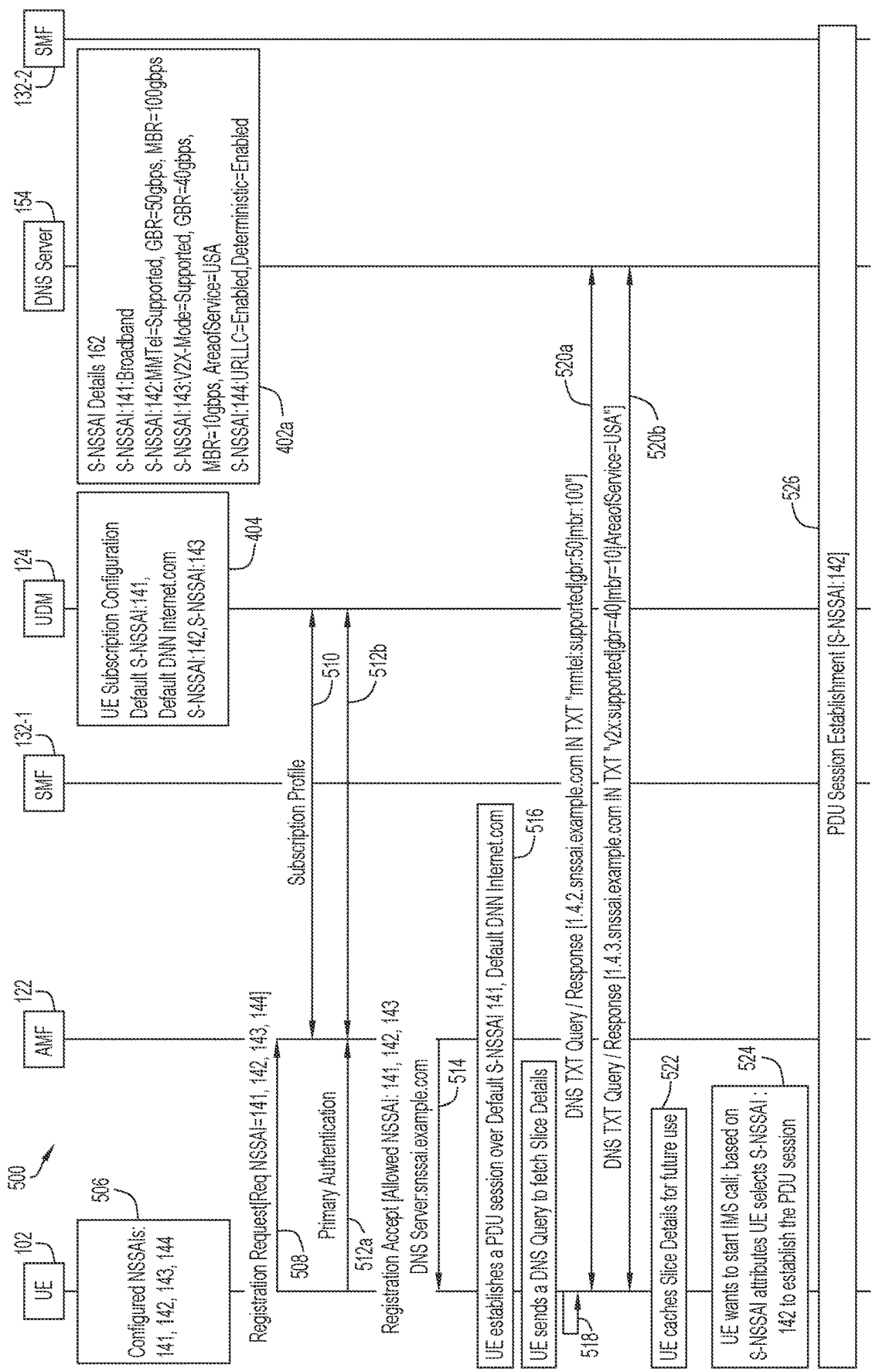
FIG. 5 is a message sequence diagram illustrating call flow associated with providing slice attribute information to a user equipment utilizing a Domain Name System (DNS) server, according to an example embodiment.

Referring to FIG. 5, FIG. 5 is a message sequence diagram illustrating another call flow 500 associated with providing slice attribute information to a user equipment utilizing DNS server 154, according to an example embodiment. FIG. 5 includes UE 102, AMF 122, SMF 132-1 for slice 130-1, UDM 124, DNS server 154, and SMF 132-2 for slice 130-2. Although not shown in FIG. 4, it is assumed that UE 102 interacts/communicates with various network elements via RAN 110/gNodeB 112, as shown in FIG. 1.

For the embodiment of FIG. 5, consider, as shown at 502, that DNS server 154 is configured with TXT resource records for S-NSSAI details 162 that include slice attribute information for each of slices 130-1, 130-2, 130-3, and 130-4 for the corresponding slice types provided by mobile core network, as discussed above with reference to FIG. 1.

At 504, consider that UDM 124 is configured with a subscription profile for a user or subscriber associated with UE 102 that identifies the default slice type with which UE 102 is authorized to establish at least one PDU session is slice 130-1, configured as 'Default S-NSSAI: 141' for a default Data Network Name (DNN) 'internet.com'. The subscription profile configured for UDM 124 at 304 further identifies that UE 102 is authorized to establish one or more PDU session(s) with slice 130-2 ('S-NSSAI: 142') and to slice 130-3 ('S-NSSAI: 143'). The subscription profile configured for UDM 124 at 504 further identifies that UE 102 is authorized to establish one or more PDU session(s) with slice 130-2 ('S-NSSAI: 142') and to slice 130-3 ('S-NSSAI: 143').

The subscription profile configured for UDM 124 at 504 further includes at least one identifier associated with DNS server 154 that enables UE 102 to query the DNS server to obtain the slice attribute information for each of the one or more slice type(s)/S-NSSAI(s) with which the UE 102 is authorized to establish one or more PDU session(s). For example, for the embodiment of FIG. 5, consider that the identifier associated with the DNS server 154 is a DNS server address for DNS server 154, such as 'DNS Server: snssai.example.com', from which the UE can construct/generate (e.g., via slice logic 106) a Fully Qualified Domain Name (FQDN) for each subscribed network slice type to utilize for querying the DNS server 154 for the slice attribute information for each network slice type. In another example embodiment, the identifier associated with the DNS server 154 configured for UDM 124 may include a FQDN for each slice type to which UE 102 is subscribed. In some embodiments, the DNS server 154 can be an authoritative DNS server for a given URI or the UE 102 may have the ability to resolve the URI by querying the authoritative DNS server for a given domain.

At 506, consider that UE 102 is configured with a set of NSSAIs, such as NSSAIs '141', '142', '143', and '143' that identify slice types that UE 102 may utilize for various services; however, as discussed below, the subscriber for UE 102 may not be authorized to utilize services (e.g., establish session(s) with) for all the slice types configured at 406, depending on the subscription profile for the subscriber associated with UE 102.

For example, as shown at 508, consider that UE 102 sends a NAS Registration Request to AMF 122 identifying NSSAIs '141', '142', '143', and '143' for the slice types to which UE 102 may desire network connectivity. At 510, AMF 122 obtains the subscription profile for UE 102 from UDM 124 and, at 512a and 512b, primary authentication for UE 102 is performed among AMF 122, UDM 124, and UE 102. Upon successful authentication of UE 102 for connection to the mobile core network 120, AMF 122 communicates a NAS Registration Accept message to UE 102, as shown at 514, that includes the allowed S-NSSAI list for UE 102 (e.g., 'Allowed NSSAI: 141, 142, 143') and also includes the DNS server address for DNS server 154 (e.g., 'DNS Server: snssai.example.com').

Although not shown in FIG. 5, in some embodiments, AMF 122 can utilize an enhanced update configuration (config) process in order to send each allowed S-NSSAI and an identifier for the DNS server, such as the DNS server address to UE 102. For example, in at least one embodiment, 3GPP the update config process may be enhanced such that the CONFIGURATION UPDATE COMMAND message can include the each allowed S-NSSAI for each slice type with which UE 102 is authorized to establish one or more PDU session(s) along with the DNS server address for DNS server 154.

Returning to the present example, consider at 516 that UE 102 establishes a PDU session over slice 130-1 (S-NSSAI: '141') via SMF 132-1 and UPF 134-1 (not shown in FIG. 5) for the default DNN 'internet.com' according procedures prescribed by 3GPP standards.

Thereafter, the UE 102 can fetch/obtain slice attribute information from DNS server 154 for one or more of the authorized slice types/S-NSSAIs utilizing the S-NSSAI list and the identifier for the DNS server 154 obtained from AMF 122 via the NAS Registration Accept message. For example, as shown at 518, consider that UE 102, via slice logic 106, generates a FQDN for each of slice type/S-NSSAI '142' and '143' based on the DNS server address obtained at 516 to utilize for performing a DNS query via DNS server 154 for the slice attribute information for each slice type. For the present example, consider that slice logic 106 is configured to generate the FQDN for each S-NSSAI based on the value of each S-NSSAI, such as '1.4.2.snssai.example.com' for the FQDN for S-NSSAI '142' and '1.4.3.snssai.example-.com' for the FQDN for S-NSSAI '143'.

Once the FQDNs are generated, the UE 102 can perform, as shown at 520a, a DNS TXT query utilizing the FQDN for S-NSSAI '142' ('1.4.2.snssai.example.com') upon DNS server 154 via the default PDU session in order to obtain the slice attribute information for S-NSSAI '142' ('mmtel:supported|gbr:50|mbr:100') stored in the TXT resource records for S-NSSAI detail 162 [in which each attribute can be separated by a '|' operator or the like, representing a concatenated string or list of attributes]. Additionally, as shown at 520b the UE can perform a DNS TXT query utilizing the FQDN for S-NSSAI '143' ('1.4.3.snssai.example.com') upon DNS server 154 via the default PDU session in order to obtain the slice attribute information for S-NSSAI '143' ('v2x-mode: supported|areaofservice:USA') stored in the TXT resource records for S-NSSAI detail 162.

As shown at 522, the UE 102 can cache/store the attribute information for slice 130-2/S-NSSAI '142' and for slice 130-3/S-NSSAI '143' via slice attribute database 108. In one embodiment, the storing at 522 can include the UE 102 storing mapping information that associates each network slice type to the attribute information for each network slice type (e.g., S-NSSAI ↔ attribute information, for each authorized S-NSSAI).

At 524, consider that UE 102 desires to initiate an IMS call and, based on the slice attributes stored for slice 130-2/S-NSSAI '142' selects, via application logic 104 and slice logic 106, slice 130-2/S-NSSAI '142' with which to establish a PDU session for the IMS call using techniques as discussed herein. As shown at 526, UE 102 establishes over slice 130-2 (S-NSSAI: '142') via SMF 132-2 and UPF 134-2 (not shown in FIG. 5) for the IMS call using 3GPP standards-based procedures.

Accordingly, FIG. 5 illustrates another technique through with slice attribute information can be provided to a UE, such as UE 102, via one or more network elements of mobile core network, such a AMF 122, which may perform various operations based on the subscription profile for UE 102 stored via UDM 124, including fetching/obtaining slice attribute information from DNS server 154 for the S-NSSAI(s)/slice type(s) with which UE 102 is authorized to establish one or more PDU session(s) utilizing one or more DNS TXT queries.

Figure 6:
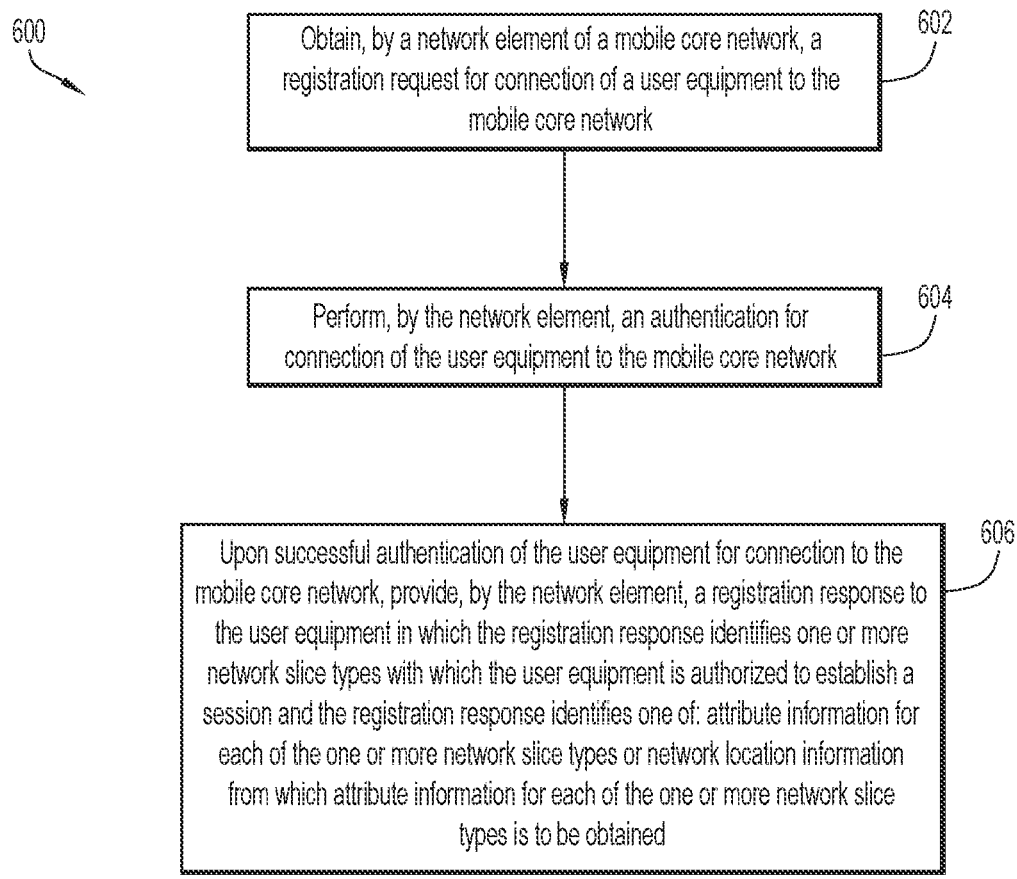
FIG. 6 is a flow chart depicting a method according to an example embodiment.

Referring to FIG. 6, FIG. 6 is a flow chart depicting a method 600 according to an example embodiment. In at least one embodiment, method 600 illustrates example operations that may be performed, at least in part, by a network element of a mobile core network, such as AMF 122 of mobile core network 120 to facilitate slice attribute information being provided to a UE, such as UE 102.

At 602, the method may include obtaining, by a network element of a mobile core network (e.g., AMF 122 of mobile core network 120), a registration request for connection of a user equipment to the mobile core network.

At 604, the method may include performing, by the network element, an authentication for connection of the user equipment to the mobile core network. For example, as illustrated in FIGS. 3A and 3B, 4, and 5, AMF 122 via UDM 124 can perform authentication of UE 102 for connection of UE 102 to the mobile core network 120.

At 606, the method may include, upon successful authentication of the user equipment for connection to the mobile core network, providing, by the network element, a registration response to the user equipment in which the registration response identifies one or more network slice types with which the user equipment is authorized to establish a session and the registration response identifies one of: attribute information for each of the one or more network slice types or network location information from which attribute information for each of the one or more network slice types is to be obtained. In some instances, the registration response can identify a plurality of network slice types with which the user equipment is allowed to establish a session and identifies one of: attribute information for each of the plurality of network slice types or network location information from which the user equipment is to obtain attribute information for each of the plurality of network slice types.

For example, in at least one embodiment, the operations at 606 may include obtaining, by the network element, the one or more (e.g., a plurality, in some instances) network slice types with which the user equipment is authorized to establish a session and a root URI from a subscription profile for the user equipment configured for a subscription database within the mobile core network (e.g., as shown at 310 of FIG. 3A). In one instance, the subscription database may be implemented as a UDM, such as UDM 124. For this embodiment, the operations at 606 may further include generating, by the network element based on the root URI, the network location information from which attribute information for each of the one or more network slice types can be obtained in which the network location information includes a URI for each of the one or more network slices with which the user equipment is authorized to establish a session (e.g., as shown at 314 of FIG. 3A in which the AMF 122 generates an S-NSSAI attribute URI for each S-NSSAI with which UE 102 is authorized to establish a PDU session). In one instance for this embodiment, the registration response may be a NAS Registration Accept message that includes one or more AVPs in which each of the one or more (e.g., a plurality, in some instances) AVPs identifies each network slice type with which the user equipment is authorized to establish a session and the URI (e.g., S-NSSAI attribute URI) for each of the one or more network slice types that the UE can utilize to obtain the attribute information for each slice type.

In at least one embodiment, the operations at 606 may include obtaining, by the network element, the one or more (e.g., a plurality, in some instances) network slice types with which the user equipment is authorized to establish a session from a subscription profile for the user equipment configured for a subscription database (e.g., UDM 124) within the mobile core network and obtaining, by the network element, the attribute information for each of the one or more network slice types with which the user equipment is authorized to establish a session from an application server (e.g., as shown at 410 and 414 of FIG. 4 in which the AMF obtains (410) the allowed S-NSSAIs from UDM 124 and fetches/obtains (414) the slice attribute information for each allowed S-NSSAI from AppServer 152). In one instance for this embodiment, the registration response may be a NAS Registration Accept message (e.g., as shown at 416) that includes a plurality of AVPs in which each of the plurality of AVPs identifies each network slice type with which the user equipment is authorized to establish a session and the attribute information for each of the plurality of network slice types.

In at least one embodiment, the operations at 606 may include obtaining, by the network element, the one or more (e.g., a plurality, in some instances) network slice types with which the user equipment is authorized to establish a session and an identifier associated with a DNS server (e.g., DNS server 154) from a subscription profile for the user equipment configured for a subscription database (e.g., UDM 124) within the mobile core network in which the identifier associated with the DNS server is the network location information identified in the registration response (e.g., as shown at 510 of FIG. 5 in which the AMF obtains the list of allowed S-NSSAIs from UDM 124 along with the identifier associated with DNS server 154, such as the address of the DNS server 154). In one instance for this embodiment, the registration response may be a NAS Registration Accept message that includes the allowed list of S-NSSAIs along with the identifier associated with the DNS server. In at least on embodiment, the identifier associated with the DNS server may be an FQDN for each of the one or more network slice types with which user equipment is authorized to establish a session that enables the user equipment to query the DNS server for the slice attribute information for each of the one or more network slice types. In at least one embodiment, the identifier associated with the DNS server may be an address for the DNS server from which a FQDN for each of the one or more network slice types with which user equipment is authorized to establish a session can be generated by the user equipment to enable the user equipment to query the DNS server for the slice attribute information for each of the one or more network slice types.

In at least one embodiment, the operations at 606 may include obtaining, by the network element, the one or more network slice types with which the user equipment is authorized to establish a session and the attribute information for each of the one or more network slice types with which the user equipment is authorized to establish a session from a subscription profile for the user equipment configured for a subscription database within the mobile core network (e.g., as discussed for FIG. 4 for embodiments in which UDM 124 may be configured (as shown at 402*b*) with S-NSSAI details that include attribute information for one or more slice types configured for mobile core network 120).

In various embodiments, the attribute information for a particular slice type may include an identification of one or more services provided by the particular slice type; a GBR provided by the particular slice type; a MBR provided by the particular slice type; quality of service information for the slice type; and service area information for the slice type.

Figure 7:
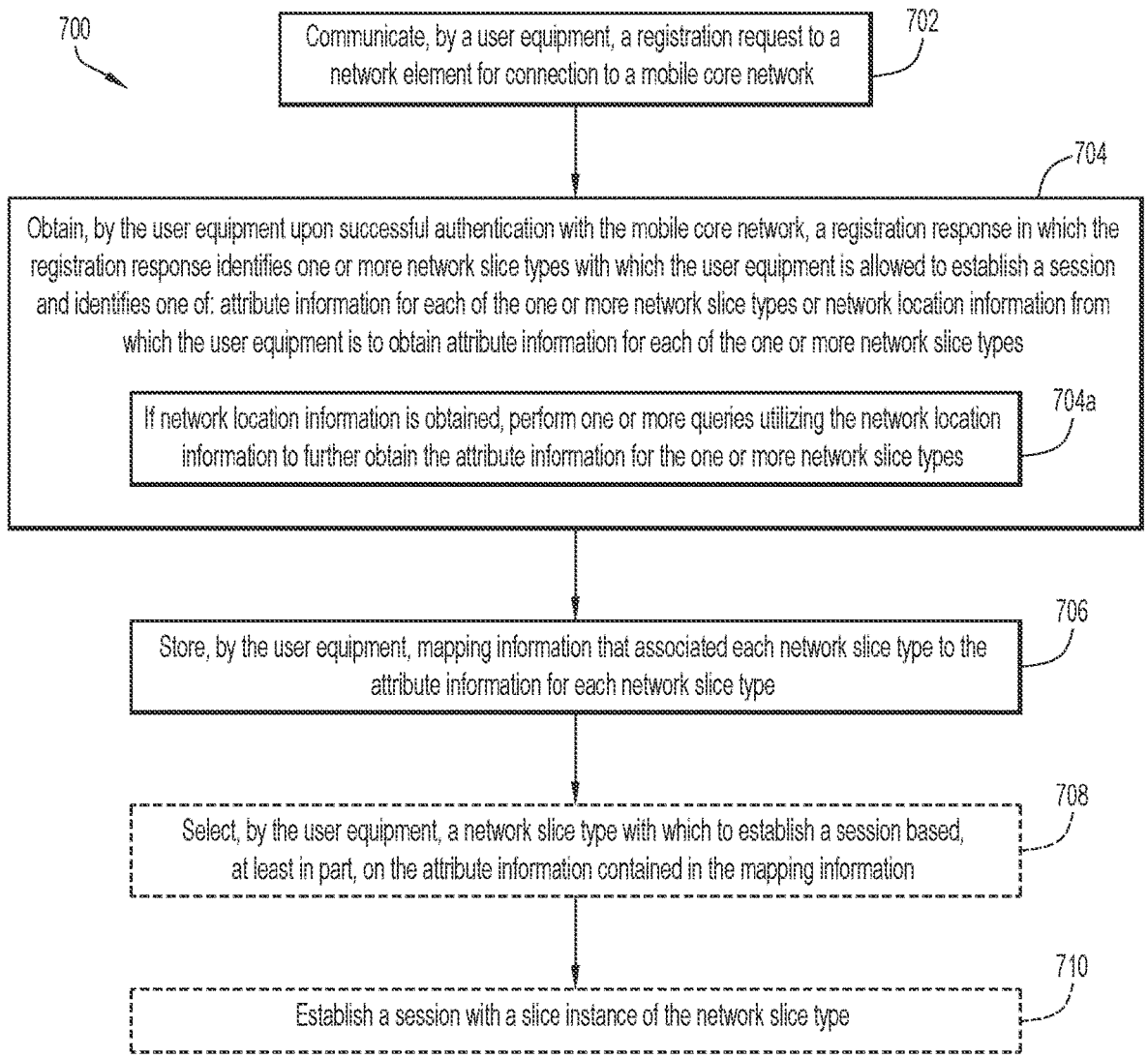
FIG. 7 is another flow chart depicting another method according to an example embodiment.

Referring to FIG. 7, FIG. 7 is a flow chart depicting a method 700 according to an example embodiment. In at least one embodiment, method 700 illustrates example operations that may be performed, at least in part, by a UE, such as UE 102 in order to obtain slice attribute information for one or more network slice types with which the UE 102 is authorized to establish one or more PDU session(s).

In at least one embodiment, the method may include, at 702, communicating, by a user equipment, a registration request to a network element (e.g. AMF 122) for connection to a mobile core network. In at least one embodiment, the registration request may be a NAS Registration Request message that identifies one or more S-NSSAIs for one or more slice types with which the UE may desire network connectivity/services.

At 704, the method may include obtaining, by the user equipment upon successful authentication with the mobile core network, a registration response in which the registration response identifies one or more network slice types with which the user equipment is allowed to establish a session and identifies one of: attribute information for each of the one or more network slice types or network location information from which the user equipment is to obtain attribute information for each of the one or more network slice types.

In at least one embodiment for the operations at 704, the registration response may be a NAS Registration Accept message that includes one or more AVPs in which each of the one or more AVPs identifies each network slice type with which the user equipment is authorized to establish a session and a URI (e.g., S-NSSAI attribute URI) for each of the one or more network slice types that the UE can utilize to obtain the attribute information for each slice type. For such an embodiment, the method may further include, as shown at 704*a*, the user equipment performing one or more queries utilizing the network location information to further obtain the attribute information for the one or more network slice types. In one instance, for example, the one or more queries may be performed utilizing an S-NSSAI attribute URI for each network slice type with which the user equipment is authorized to establish a session in order to query an application server (e.g., AppServer 152) for the attribute information for each network slice type.

In at least one embodiment for the operations at 704, the registration response may be a NAS Registration Accept message that includes one or more AVPs in which each of the one or more AVPs identifies each network slice type with which the user equipment is authorized to establish a session and identifies attribute information for each of the one or more network slice types.

In at least one embodiment for the operations at 704, the registration response may be a NAS Registration Accept message that includes an allowed list of S-NSSAIs along with an identifier associated with a DNS server (e.g., DNS server 154). In at least one embodiment, the identifier associated with the DNS server may be an FQDN for each of the one or more network slice types with which user equipment is authorized to establish a session that enables the user equipment to query the DNS server for the slice attribute information for each of the one or more network slice types. In at least one embodiment, the identifier associated with the DNS server may be an address for the DNS server from which a FQDN for each of the one or more network slice types with which user equipment is authorized to establish a session can be generated by the user equipment to enable the user equipment to query the DNS server for the slice attribute information for each of the one or more network slice types. For such an embodiment, the method may further include, as shown at 704*a*, the user equipment performing one or more queries utilizing the network location information to further obtain the attribute information for the one or more network slice types. In one instance, for example, the one or more queries may be DNS queries performed utilizing the identifier associated with the DNS server in which the identifier is either utilized to generate a corresponding FQDN for each corresponding network slice type or in which the identifier is the corresponding FQDNs for each corresponding network slice type with which the user equipment can perform a DNS query upon the DNS server to obtain the attribute information for each of the one or more network slice types.

At 706, the method can include storing, by the user equipment, mapping information that associates each network slice type to the attribute information for each network slice type (e.g., S-NSSAI ↔attribute information, for each authorized S-NSSAI). In one instance, the mapping information can be stored via slice attribute database 108 for UE 102.

In at least one embodiment, as shown at 708, the method can include selecting, by the user equipment (e.g., via application logic 104/slice logic 106 for UE 102), a network slice type with which to establish a session based, at least in part, on the attribute information contained in the mapping information and, as shown at 710, establishing a session with a slice instance of the selected network slice type.

Accordingly, utilizing techniques provided herein, a UE can perform slice selection based on the needs of different applications. If a slice attribute/property indicates that a given slice can support low latency services (e.g., <5 milliseconds), that attribute/property alone may be sufficient for a UE/application to select that slice for a given application, as opposed to the network having to push an explicit URSP policy to the UE.

Figure 8:
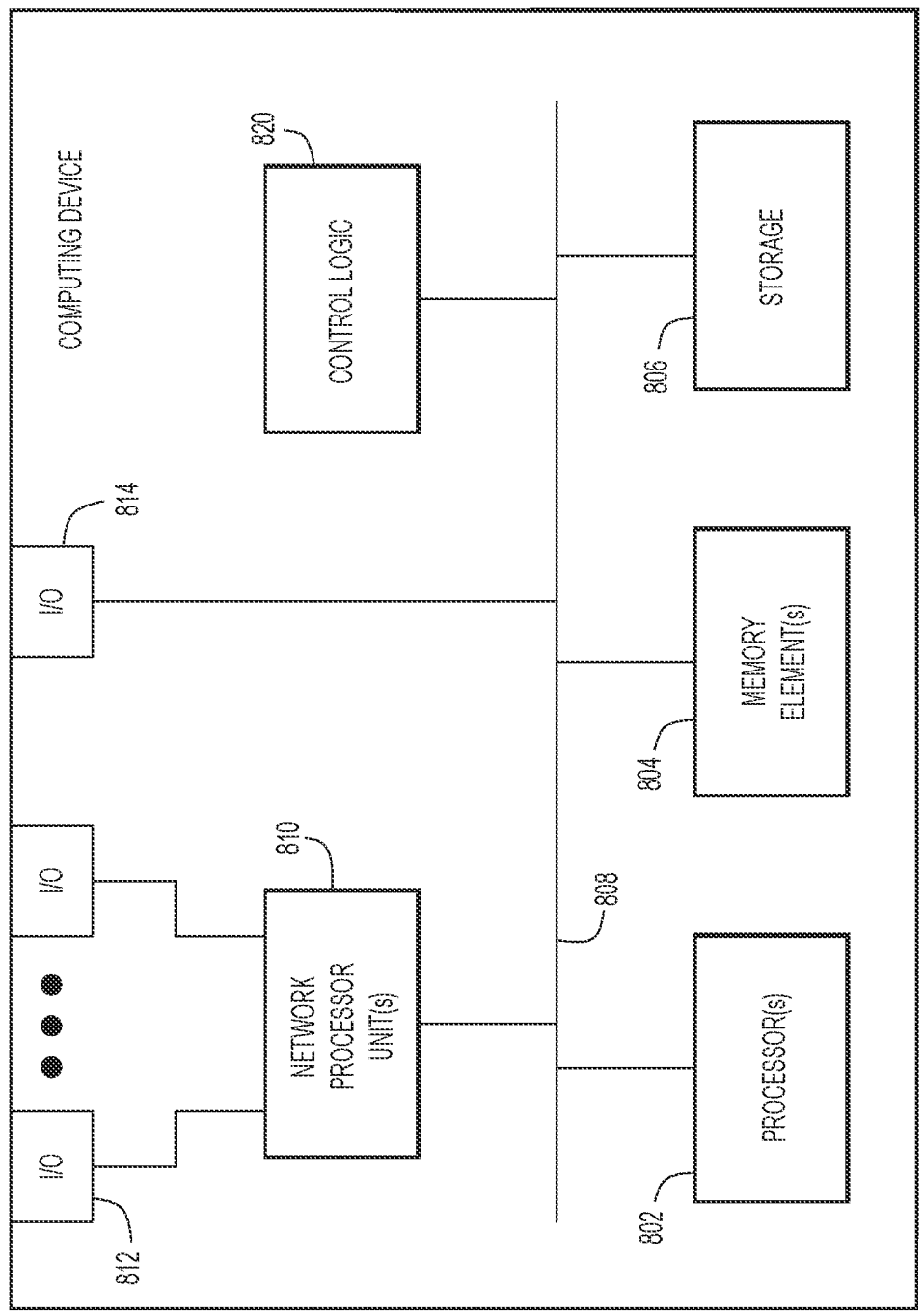
FIG. 8 is a hardware block diagram of a computing device that may perform functions associated with any combination of operations, in connection with the techniques discussed herein.

Referring to FIG. 8, FIG. 8 illustrates a hardware block diagram of a computing device 800 that may perform functions associated with operations discussed herein. In various embodiments, a computing device or apparatus, such as computing device 800 or any combination of computing devices 800, may be configured as any entity/entities as discussed herein in order to perform operations of the various techniques discussed herein, such as, for example, any of AMF 122, UDM 124, AppServer 152, DNS server 154, an SMF for a given instantiated network slice type, a UPF for a given instantiated network slice type, and/or any other network element discussed for embodiments herein.

In at least one embodiment, computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., hardware processor(s)) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communications (wired and/or wirelessly) between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) and/or antennas/antenna arrays now known or hereafter developed. Thus, the network processor unit(s) 810 and/or network I/O interface(s) 812 may include suitable interfaces for receiving, transmitting, and/or otherwise communicating (in a wired and/or wireless manner) data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one embodiment in which computing device is implemented as at least one policy function, the control logic 820 can include instructions that, when executed, cause processor(s) 802 to perform functions including obtaining, by the computing device (for a mobile core network), a registration request for connection of a user equipment to the mobile core network; performing an authentication for connection of the user equipment to the mobile core network; and upon successful authentication of the user equipment for connection to the mobile core network, providing, by the network element, a registration response to the user equipment, wherein the registration response identifies one or more network slice types with which the user equipment is authorized to establish a session and the registration response identifies one of: attribute information for each of the one or more network slice types or network location information from which attribute information for each of the one or more network slice types is to be obtained.

Figure 9:
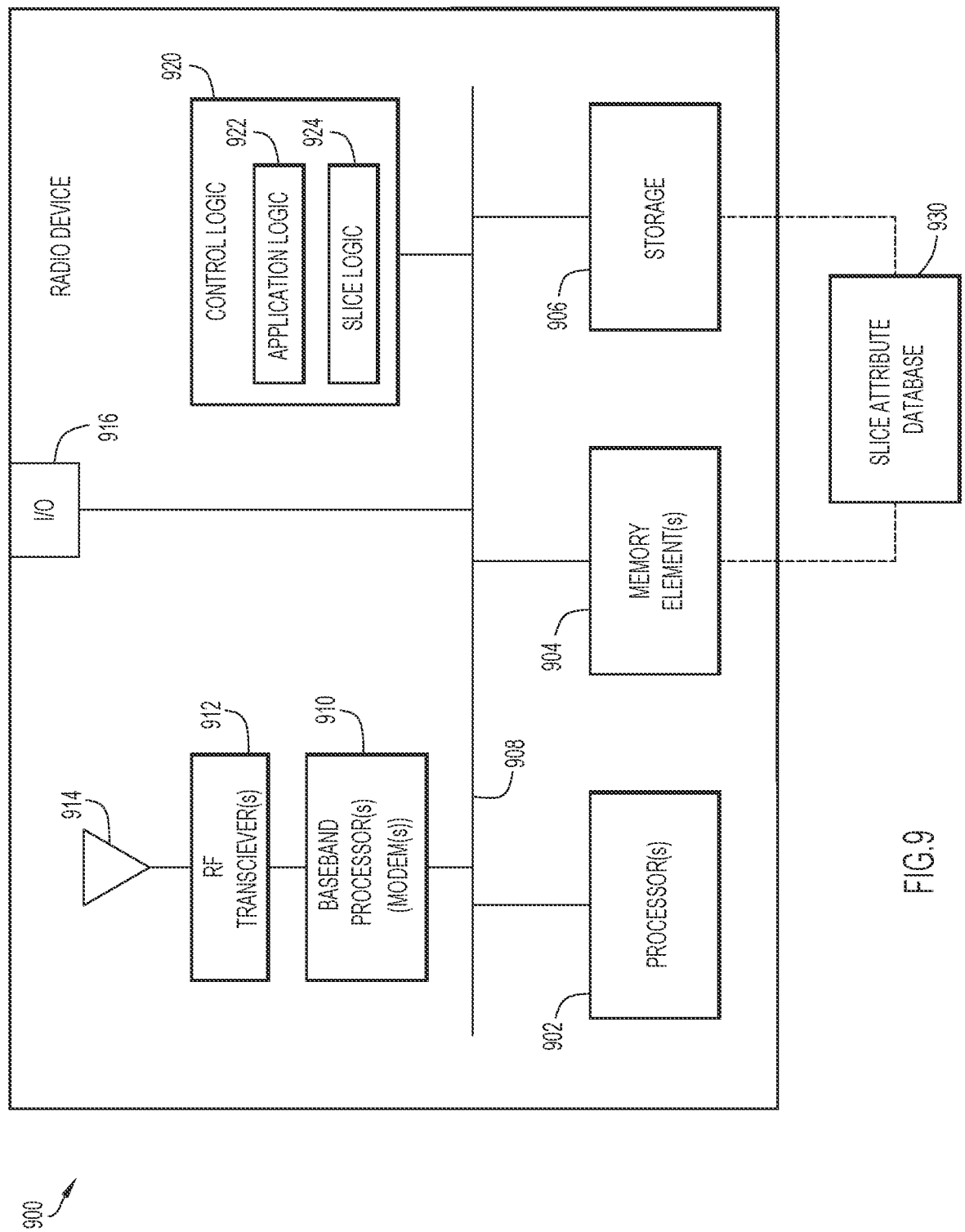
FIG. 9 is a hardware block diagram of a user equipment that may perform functions associated with any combination of operations, in connection with the techniques discussed herein.

Referring to FIG. 9, FIG. 9 illustrates a hardware block diagram of a user equipment 900 that may perform functions associated with operations discussed herein. In various embodiments, a radio device or apparatus, such as user equipment 900 or any combination of user equipment 900, may be configured as any radio node/nodes as depicted herein in order to perform operations of the various techniques discussed herein, such as operations that may be performed by UE 102, according to an example embodiment.

In at least one embodiment, user equipment 900 may be any apparatus that may include one or more processor(s) 902, one or more memory element(s) 904, storage 906, a bus 908, a baseband processor or modem 910, one or more radio RF transceiver(s) 912, one or more antennas or antenna arrays 914, one or more I/O interface(s) 916, and control logic 920, which may include application logic 922 for one or more application provided for the user equipment 900 slice logic 924.

The one or more processor(s) 902, one or more memory element(s) 904, storage 906, bus 908, and I/O interface(s) 916 may be configured/implemented in any manner described herein, such as described herein at least with reference to FIG. 8. In at least one embodiment, any combination of memory element(s) 904 and/or storage 906 may be configured to include a slice attribute database 930, which can be utilized to store a list of allowed S-NSSAI(s) and attribute information for each of one or more network slice types with which the user equipment 900 is authorized to establish one or more PDU session(s) (e.g., utilizing an S-NSSAI ↔ attribute information mapping, as discussed herein).

The RF transceiver(s) 912 may perform RF transmission and RF reception of wireless signals via antenna(s)/antenna array(s) 914, and the baseband processor (modem) 910 performs baseband modulation and demodulation, etc. associated with such signals to enable wireless communications for user equipment 900.

In various embodiments, control logic 920, application logic 922, and slice logic 924, can include instructions that, when executed, cause processor(s) 902 to perform operations, which can include, but not be limited to, providing overall control operations of user equipment 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, any combination of control logic 920, application logic 922, and/or slice logic 924 can include instructions that, when executed, cause processor(s) 902 to perform operations including communicating, a registration request to a network element (e.g. AMF 122) for connection to a mobile core network; obtaining, by the user equipment upon successful authentication with the mobile core network, a registration response in which the registration response identifies one or more network slice types with which the user equipment is allowed to establish a session and identifies one of: attribute information for each of the one or more network slice types or network location information from which the user equipment is to obtain attribute information for each of the one or more network slice types; and storing, by the user equipment, mapping information that associates each network slice type to the attribute information for each network slice type.

In some instances, the instructions, when executed, may further cause processor(s) 902 to perform operations including selecting a network slice type with which to establish a session based, at least in part, on the attribute information contained in the mapping information and establishing a session with a slice instance of the selected network slice type.

The programs described herein (e.g., control logic 820 of computing device 800 and/or control logic 920, application logic 922, and slice logic 924 of user equipment 900) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 804 of computing device 800 and memory element(s) 904 of user equipment 900) and/or storage (e.g., storage 806 of computing device 800 and storage 906 of user equipment 900) can store data, software, code, instructions (e.g., processor instructions), logic, parameters, combinations thereof, and/or the like used for operations described herein. This includes memory element(s) 804/904 and/or storage 806/906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a network element of a mobile core network, a registration request for connection of a user equipment to the mobile core network; performing an authentication for connection of the user equipment to the mobile core network; and upon successful authentication of the user equipment for connection to the mobile core network, providing, by the network element, a registration response to the user equipment, wherein the registration response identifies one or more network slice types with which the user equipment is authorized to establish a session and the registration response identifies one of: attribute information for each of the one or more network slice types or network location information from which attribute information for each of the one or more network slice types is to be obtained. The registration request may be a Non-Access Stratum (NAS) Registration Request message and the registration response may be a NAS Registration Accept message (assuming successful authentication of the user equipment). In one instance, the registration response can identify a plurality of network slice types with which the user equipment is allowed to establish a session and identifies one of: attribute information for each of the plurality of network slice types or network location information from which the user equipment is to obtain attribute information for each of the plurality of network slice types.

In various embodiments, the attribute information for a particular slice type can include one or more of: an identification of one or more services provided by the particular slice type; performance parameters associated with the particular slice type (e.g., a guaranteed bit rate (GBR) provided by the particular slice type; a maximum bit rate (MBR) provided by the particular slice type; quality of service (QoS) information for the slice type, etc.); and service area information for the particular slice type.

In at least one instance, the method may further include obtaining, by the network element, the one or more network slice types with which the user equipment is authorized to establish a session and a root uniform resource identifier (URI) from a subscription profile for the user equipment configured for a subscription database within the mobile core network; and generating, by the network element based on the root URI, the network location information from which attribute information for each of the one or more network slice types can be obtained, wherein the network location information includes a URI for each of the one or more network slice types with which the user equipment is authorized to establish a session.

In one instance, the method may further include obtaining, by the network element, the one or more network slice types with which the user equipment is authorized to establish a session from a subscription profile for the user equipment configured for a subscription database within the mobile core network; and obtaining, by the network element, the attribute information for each of the one or more network slice types with which the user equipment is authorized to establish a session from an application server.

In one instance, the registration response includes one or more Attribute-Value Pairs (AVPs) and each of the one or more AVPs identifies each network slice type with which the user equipment is authorized to establish a session and the attribute information for each of the one or more network slice types.

In one instance, the method may include obtaining, by the network element, the one or more network slice types with which the user equipment is authorized to establish a session and an identifier associated with a Domain Name System (DNS) server from a subscription profile for the user equipment configured for a subscription database within the mobile core network, wherein the identifier associated with the DNS server is the network location information identified in the registration response.

In one instance, the identifier associated with the DNS server is one of: a Fully Qualified Domain Name (FQDN) for each of the one or more network slice types with which the user equipment is authorized to establish a session that enables the user equipment to query the DNS server for the attribute information for each of the one or more network slice types; or an address for the DNS server from which a Fully Qualified Domain Name (FQDN) for each of the one or more network slice types with which the user equipment is authorized to establish a session can be generated by the user equipment to enable the user equipment to query the DNS server for the attribute information for each of the one or more network slice types.

In one instance, the method may further include obtaining, by the network element, the one or more network slice types with which the user equipment is authorized to establish a session and the attribute information for each of the one or more network slice types with which the user equipment is authorized to establish a session from a subscription profile for the user equipment configured for a subscription database within the mobile core network.

In one form, another computer-implemented method is provided that may include communicating, by a user equipment, a registration request to a network element for connection to a mobile core network; obtaining, by the user equipment upon successful authentication with the mobile core network, a registration response in which the registration response identifies one or more network slice types with which the user equipment is allowed to establish a session and identifies one of: attribute information for each of the one or more network slice types or network location information from which the user equipment is to obtain attribute information for each of the one or more network slice types; and storing, by the user equipment, mapping information that associates each network slice type to the attribute information for each network slice type. In one instance, the registration response can identify a plurality of network slice types with which the user equipment is allowed to establish a session and identifies one of: attribute information for each of the plurality of network slice types or network location information from which the user equipment is to obtain attribute information for each of the plurality of network slice types.

In one instance, the method may further include selecting, by the user equipment, a network slice type with which to establish a session based, at least in part, on the attribute information contained in the mapping information and establishing a session with a slice instance of the selected network slice type.

In one instance, the registration response is a NAS Registration Accept message that includes one or more AVPs in which each of the one or more AVPs identifies each network slice type with which the user equipment is authorized to establish a session and a URI for each of the one or more network slice types that the UE can utilize to obtain the attribute information for each slice type. For such an instance, the method may further include the user equipment performing one or more queries utilizing the network location information to further obtain the attribute information for the one or more network slice types. In one instance, for example, the one or more queries may be performed utilizing an S-NSSAI attribute URI for each network slice type with which the user equipment is authorized to establish a session in order to query an application server for the attribute information for each network slice type.

In one instance, the registration response is a NAS Registration Accept message that includes one or more AVPs in which each of the one or more AVPs identifies each network slice type with which the user equipment is authorized to establish a session and identifies attribute information for each of the one or more network slice types.

In one instance, the registration response is a NAS Registration Accept message that includes an allowed list of S-NSSAIs along with an identifier associated with a DNS server (e.g., DNS server 154). In at least one instance, the identifier associated with the DNS server may be an FQDN for each of the one or more network slice types with which user equipment is authorized to establish a session that enables the user equipment to query the DNS server for the slice attribute information for each of the one or more network slice types. In at least one instance, the identifier associated with the DNS server may be an address for the DNS server and the method may include the user equipment generating an FQDN for each of the one or more network slice types with which user equipment is authorized to establish a session based, at least in part, on the address for the DNS server. In at least one instance, the method may include the user equipment querying the DNS server for the slice attribute information for each of the one or more network slice types using the FQDN for each of the one or more network slice types with which the user equipment is authorized to establish a session.

In summary, techniques herein may facilitate any combination of: delivering slice attributes utilizing a URI provided to a UE over a NAS communication; delivering slice attributes in the form of attribute-value pairs AVPs, XML encoding, JSON encoding, or the like over a NAS communication; delivering slice attributes via DNS queries, as DNS TXT resource records; a UE utilizing standard conventions forming an FQDN forming the FQDN to query or an FQDN being delivered to the UE so the UE can query a DNS server for slice attribute information; core network functions (e.g., AMF, UDM/UDR, NSSF and/or any other application function) storing/obtaining slice attributes, URIs, DNS FQDNs, etc. for use in the 3GPP signaling; and/or logic being provided for a UE for dynamically selecting a slice type for establishing a PDU session based on application criteria/performance criteria and/or end user inputs.

Further, as discussed herein, every network slice type that may be provided/supported in a mobile core network can include a set of properties associated therewith, which can be encoded in XML, TLV, JSON type encodings (e.g., generally, a property file or representation of slice type attributes/properties/details). In some instances, as discussed for the embodiment of FIGS. 3A and 3B, for example, a URI may represent a resource name that identifies the property file or details containing attribute information for a given slice type, which a UE and/or an AMF can utilize to fetch the attributes.

In another instance, a DNS server can be queried by providing the resource name (e.g., an FQDN for a TXT resource record containing S-NSSAI details including the attribute information for a given slice type). Over access interfaces, such as NAS, a simple resource name for each of the slice types can be provided to a UE, which the UE can use via DNS queries to fetch the property file for each of one or more slice type(s), or the actual property file (e.g., slice attributes) may be sent over NAS. Thus, in various embodiments, the packet core (e.g., mobile core network) can maintain a relation between slice type and a URI (slice/URI); slice type, URI and the property file; and/or slice type and an FQDN.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
communicating, by a user equipment, a registration request to a mobile core network for connection of the user equipment to the mobile core network;
obtaining, upon successful authentication of the user equipment for connection to the mobile core network, a registration response, wherein the registration response identifies a plurality of network slice types with which the user equipment is authorized to establish a session and the registration response identifies network location information associated with one of an application server or a Domain Name System (DNS) server from which attribute information for one or more corresponding network slice types of the plurality of network slice types is to be obtained by the user equipment;

performing, by the user equipment, session establishment for a default network slice type of the plurality of network slice types; and following the session establishment with the default network slice type, performing one or more corresponding query toward one of the application server or the DNS server utilizing the network location information identified in the registration response to obtain corresponding attribute information for each of the one or more corresponding network slice types of the plurality of network slice types from one of the application server or the DNS server.

2. The method of claim 1, wherein the attribute information for at least one corresponding network slice type of the plurality of network slice types includes:
an identification of one or more services provided by the at least one corresponding network slice type;
performance parameters associated with the at least one corresponding network slice type that identify, at least in part, a guaranteed bit rate and a maximum bit rate supported by the at least one corresponding network slice type; and
service area information for the at least one corresponding network slice type.

3. The method of claim 1, the network location information includes each of a corresponding uniform resource indicator (URI) for each of the one or more corresponding network slice types of the plurality of network slice types that enables the user equipment to query the application server to obtain the attribute information for each of the one or more corresponding network slice types of the plurality of network slice types following the session establishment by the user equipment with the default network slice type.

4. The method of claim 1, the network location information is an identifier associated with DNS server.

5. The method of claim 4, wherein the identifier associated with the DNS server is one of:
a Fully Qualified Domain Name (FQDN) for each of the one or more corresponding network slice types of the plurality of network slice types with which the user equipment is authorized to establish a session that enables the user equipment to query the DNS server for the attribute information for each of the one or more corresponding network slice types of the plurality of network slice types following the session establishment by the user equipment with the default network slice type; or
an address for the DNS server from which a Fully Qualified Domain Name (FQDN) for each of the one or more corresponding network slice types of the plurality of network slice types with which the user equipment is authorized to establish a session can be generated by the user equipment to enable the user equipment to query the DNS server for the attribute information for each of the one or more corresponding network slice types of plurality of network slice types following the session establishment by the user equipment with the default network slice type.

6. The method of claim 1, wherein particular attribute information for at least one network slice type of the plurality of network slice types is identified via a DNS text record that is obtained by the user equipment from the DNS server based on a query of the user equipment towards the DNS server to obtain the particular attribute information for the at least one network slice type.

7. The method of claim 1, further comprising:
storing, by the user equipment, mapping information that associates each corresponding network slice type of the plurality of network slice types to corresponding attribute information for each corresponding network slice type.

8. The method of claim 7, further comprising:
selecting, by the user equipment, a particular network slice type of the plurality of network slice types with which to establish another session based, at least in part, on the attribute information associated with the particular network slice type contained in the mapping information.

9. The method of claim 8, wherein the selecting includes determining that the attribute information associated with the particular network slice type satisfies one or more operating criteria for an application configured for the user equipment.

10. The method of claim 9, further comprising:
performing, by the user equipment, session establishment for the particular network slice type.

11. One or more non-transitory computer readable storage media encoded with instructions that, when executed by a processor, cause the processor to perform operations, comprising:
communicating, by a user equipment, a registration request to a mobile core network for connection of the user equipment to the mobile core network;
obtaining, upon successful authentication of the user equipment for connection to the mobile core network, a registration response, wherein the registration response identifies a plurality of network slice types with which the user equipment is authorized to establish a session and the registration response identifies network location information associated with one of an application server or a Domain Name System (DNS) server from which attribute information for one or more corresponding network slice types of the plurality of network slice types is to be obtained by the user equipment;
performing, by the user equipment, session establishment for a default network slice type of the plurality of network slice types; and
following the session establishment with the default network slice type, performing one or more corresponding query toward one of the application server or the DNS server utilizing the network location information identified in the registration response to obtain corresponding attribute information for each of the one or more corresponding network slice types of the plurality of network slice types from one of the application server or the DNS server.

12. The media of claim 11, wherein the attribute information for at least one corresponding network slice type of the plurality of network slice types includes:
an identification of one or more services provided by the at least one corresponding network slice type;
performance parameters associated with the at least one corresponding network slice type that identify, at least in part, a guaranteed bit rate and a maximum bit rate supported by the at least one corresponding network slice type; and
service area information for the at least one corresponding network slice type.

13. The media of claim 11, the network location information includes each of a corresponding uniform resource indicator (URI) for each of the one or more corresponding network slice types of the plurality of network slice types that enables the user equipment to query the application server to obtain the attribute information for each of the one or more corresponding network slice types of the plurality of network slice types following the session establishment by the user equipment with the default network slice type.

14. The media of claim 11, the network location information is an identifier associated with DNS server.

15. The media of claim 14, wherein the identifier associated with the DNS server is one of:
   a Fully Qualified Domain Name (FQDN) for each of the one or more corresponding network slice types of the plurality of network slice types with which the user equipment is authorized to establish a session that enables the user equipment to query the DNS server for the attribute information for each of the one or more corresponding network slice types of the plurality of network slice types following the session establishment by the user equipment with the default network slice type; or
   an address for the DNS server from which a Fully Qualified Domain Name (FQDN) for each of the one or more corresponding network slice types of the plurality of network slice types with which the user equipment is authorized to establish a session can be generated by the user equipment to enable the user equipment to query the DNS server for the attribute information for each of the one or more corresponding network slice types of plurality of network slice types following the session establishment by the user equipment with the default network slice type.

16. A user equipment comprising:
   at least one memory element for storing data; and
   at least one processor for executing instructions associated with the data, wherein executing the instructions causes the user equipment to perform operations, comprising:
      communicating a registration request to a mobile core network for connection of the user equipment to the mobile core network;
      obtaining, upon successful authentication of the user equipment for connection to the mobile core network, a registration response, wherein the registration response identifies a plurality of network slice types with which the user equipment is authorized to establish a session and the registration response identifies network location information associated with one of an application server or a Domain Name System (DNS) server from which attribute information for one or more corresponding network slice types of the plurality of network slice types is to be obtained by the user equipment;
      performing, by the user equipment, session establishment for a default network slice type of the plurality of network slice types; and
      following the session establishment with the default network slice type, performing one or more corresponding query toward one of the application server or the DNS server utilizing the network location information identified in the registration response to obtain corresponding attribute information for each of the one or more corresponding network slice types of the plurality of network slice types from one of the application server or the DNS server.

17. The user equipment of claim 16, the network location information includes each of a corresponding uniform resource indicator (URI) for each of the one or more corresponding network slice types of the plurality of network slice types that enables the user equipment to query the application server to obtain the attribute information for each of the one or more corresponding network slice types of the plurality of network slice types following the session establishment by the user equipment with the default network slice type.

18. The user equipment of claim 16, the network location information is an identifier associated with DNS server.

19. The user equipment of claim 18, wherein the identifier associated with the DNS server is one of:
   a Fully Qualified Domain Name (FQDN) for each of the one or more corresponding network slice types of the plurality of network slice types with which the user equipment is authorized to establish a session that enables the user equipment to query the DNS server for the attribute information for each of the one or more corresponding network slice types of the plurality of network slice types following the session establishment by the user equipment with the default network slice type; or
   an address for the DNS server from which a Fully Qualified Domain Name (FQDN) for each of the one or more corresponding network slice types of the plurality of network slice types with which the user equipment is authorized to establish a session can be generated by the user equipment to enable the user equipment to query the DNS server for the attribute information for each of the one or more corresponding network slice types of plurality of network slice types following the session establishment by the user equipment with the default network slice type.

20. The user equipment of claim 16, wherein executing the instructions causes the user equipment to perform further operations, comprising:
   storing mapping information that associates each corresponding network slice type of the plurality of network slice types to corresponding attribute information for each corresponding network slice type.

* * * * *